United States Patent
Shah

(10) Patent No.: US 8,535,417 B2
(45) Date of Patent: Sep. 17, 2013

(54) RECOVERY OF CARBON DIOXIDE FROM FLUE GAS

(75) Inventor: Minish Mahendra Shah, East Amherst, NY (US)

(73) Assignee: Praxair Technology, Inc., Danbury, CT (US)

(*) Notice: Subject to any disclaimer, the term of this patent is extended or adjusted under 35 U.S.C. 154(b) by 679 days.

(21) Appl. No.: 12/508,035

(22) Filed: Jul. 23, 2009

(65) Prior Publication Data
US 2010/0024476 A1    Feb. 4, 2010

Related U.S. Application Data

(60) Provisional application No. 61/084,423, filed on Jul. 29, 2008.

(51) Int. Cl.
*B01D 53/04* (2006.01)

(52) U.S. Cl.
USPC ........ 95/139; 95/140; 95/93; 95/103; 95/117; 95/105; 95/106; 96/121; 96/122; 96/126; 96/128; 96/130

(58) Field of Classification Search
USPC ............... 95/98, 101, 105, 140, 93, 103, 139; 96/122, 146, 149, 154; 423/648.1, 650, 651, 423/655, 656, 247, 239.1, 437.1, 437.2; 62/636
See application file for complete search history.

(56) References Cited

U.S. PATENT DOCUMENTS

| | | |
|---|---|---|
| 3,130,026 A | 4/1964 | Becker |
| 4,152,129 A | 5/1979 | Trentham et al. |
| 4,171,206 A | 10/1979 | Sircar |
| 4,299,596 A | 11/1981 | Benkmann |
| 4,417,449 A | 11/1983 | Hegarty et al. |
| 4,441,900 A | 4/1984 | Swallow |
| 4,595,404 A | 6/1986 | Ozero et al. |
| 4,711,645 A | 12/1987 | Kumar |
| 4,753,666 A | 6/1988 | Pastor et al. |
| 4,762,543 A | 8/1988 | Pantermuehl et al. |
| 4,770,676 A | 9/1988 | Sircar et al. |
| 4,790,858 A | 12/1988 | Sircar |

(Continued)

FOREIGN PATENT DOCUMENTS

| | | |
|---|---|---|
| CN | 1347747 | 5/2002 |
| DE | 3639779 A1 | 6/1988 |

(Continued)

OTHER PUBLICATIONS

Chou et al., "CO2 Recovery by Vacuum Swing Adsorption", Separation and Purification Technology (2004), pp. 51-56.

(Continued)

*Primary Examiner* — Duane Smith
*Assistant Examiner* — Minh-Chau Pham
(74) *Attorney, Agent, or Firm* — Iurie A. Schwartz

(57) ABSTRACT

Carbon dioxide-containing gas such as flue gas and a carbon dioxide-rich stream are compressed and the combined streams are then treated to desorb moisture onto adsorbent beds and then subjected to subambient-temperature processing to produce a carbon dioxide product stream and a vent stream. The vent stream is treated to produce a carbon dioxide-depleted stream which can be used to desorb moisture from the beds, and a carbon dioxide-rich stream which is combined with the carbon dioxide-containing gas.

11 Claims, 25 Drawing Sheets

(56) References Cited

U.S. PATENT DOCUMENTS

| | | | |
|---|---|---|---|
| 4,813,980 A | | 3/1989 | Sircar |
| 4,840,647 A | | 6/1989 | Hay |
| 4,846,851 A | | 7/1989 | Guro et al. |
| 4,857,083 A | | 8/1989 | DiMartino |
| 4,869,894 A | | 9/1989 | Wang et al. |
| 4,913,709 A | * | 4/1990 | Kumar ............................ 95/100 |
| 4,914,218 A | | 4/1990 | Kumar et al. |
| 4,952,223 A | | 8/1990 | Kirshnamurthy et al. |
| 4,963,339 A | * | 10/1990 | Krishnamurthy et al. . 423/437.2 |
| 5,000,925 A | | 3/1991 | Krishnamurthy et al. |
| 5,003,517 A | * | 3/1991 | Greer, Jr. ....................... 367/178 |
| 5,017,204 A | | 5/1991 | Gottier et al. |
| 5,026,406 A | | 6/1991 | Kumar |
| 5,051,115 A | | 9/1991 | Leitgeb et al. |
| 5,248,322 A | | 9/1993 | Kumar |
| 5,294,247 A | | 3/1994 | Scharpf et al. |
| 5,354,346 A | | 10/1994 | Kumar |
| 5,669,960 A | * | 9/1997 | Couche ............................ 95/96 |
| 5,753,010 A | * | 5/1998 | Sircar et al. ...................... 95/45 |
| 5,792,239 A | | 8/1998 | Reinhold, III et al. |
| 5,974,829 A | | 11/1999 | Novak et al. |
| 5,980,857 A | * | 11/1999 | Kapoor et al. ............. 423/648.1 |
| 6,070,431 A | | 6/2000 | Howard |
| 6,090,312 A | | 7/2000 | Ziaka et al. |
| 6,224,843 B1 | | 5/2001 | Ahmed et al. |
| 6,245,127 B1 | | 6/2001 | Kane et al. |
| 6,301,927 B1 | | 10/2001 | Reddy |
| 6,340,382 B1 | | 1/2002 | Baksh et al. |
| 6,477,859 B2 | | 11/2002 | Wong et al. |
| 6,497,852 B2 | | 12/2002 | Chakravarti et al. |
| 6,500,241 B2 | | 12/2002 | Reddy |
| 6,551,380 B1 | | 4/2003 | Reddy et al. |
| 7,124,605 B2 | | 10/2006 | Parro et al. |
| 7,850,763 B2 | | 12/2010 | White et al. |
| 8,075,672 B2 | * | 12/2011 | Virani et al. .................... 95/105 |
| 2007/0227352 A1 | | 10/2007 | Kumar |
| 2007/0227353 A1 | | 10/2007 | Kumar |
| 2007/0231244 A1 | | 10/2007 | Shah et al. |
| 2007/0232706 A1 | | 10/2007 | Shah et al. |
| 2007/0261551 A1 | | 11/2007 | Sawada et al. |
| 2008/0247928 A1 | * | 10/2008 | Virani ........................ 423/239.1 |
| 2010/0129284 A1 | * | 5/2010 | Niitsuma et al. ........... 423/437.1 |
| 2010/0288123 A1 | * | 11/2010 | Chen et al. ........................ 95/93 |
| 2011/0271714 A1 | * | 11/2011 | Reddy et al. ..................... 62/636 |

FOREIGN PATENT DOCUMENTS

| | | |
|---|---|---|
| EP | 0 620 035 A1 | 10/1994 |
| FR | 2 872 890 | 1/2006 |
| GB | 2 155 805 A | 10/1985 |
| JP | 56-077673 | 6/1981 |
| WO | WO 99/35455 | 7/1999 |
| WO | WO2004/089499 A2 | 10/2004 |
| WO | WO2006/037320 A1 | 4/2006 |
| WO | WO 2006/054008 A1 | 5/2006 |
| WO | WO 2008/123337 A1 * | 10/2008 |

OTHER PUBLICATIONS

Ko et al., "Optimization of Pressure Swing Adsorption and Fractionated Vacuum Pressure Swing Adsorption Processes for CO2 Capture", I&EC Res. (2005), pp. 8084-8094.

Reynolds et al., "New Pressure Swing Adsorption Cycles for CO2 Sequestration", Adsorption (2005), pp. 531-536.

Takamura et al., "Evaluation of Dual-Bed Pressure Swing Adsorption for CO2 Recovery from Boiler Exhaust Gas", Separation & Purification Tech. (2001), pp. 519-528.

White, V., "Purification of Oxyfuel Derived CO2 for Sequestration or EOR", presented at $2^{nd}$ Workshop, International Oxy-Combustion Research Network, Windsor, CT, Jan. 25-26, 2007.

Xiao et al., "Recovery of CO2 from Flue Gas Streams by Vacuum Swing Adsorption", AIChE Mtg. (2005).

Zhang et al., "Experimental Pilot-Scale Study of CO2 Recovery from Flue Gas Streams by Vacuum Swing Adsorption", AIChE Mtg. (2005).

International Search Report dated Nov. 12, 2009 prepared by the European Patent Office for International Application No. PCT/US20909/051792.

* cited by examiner

CO2 VPSA - 6 Beds, 3 Pressure Equalizations and Flow through the Evacuating bed

CO₂ VPSA - 5 Beds, 2 Pressure Equalizations and Flow through the Evacuating bed

| | | | | | | | | | |
|---|---|---|---|---|---|---|---|---|---|
| 1 | Feed | | DP1 | DP2 | DPf | Evacuation | | PE2 | PE1 | FeRP |
| 2 | PE1 | FeRP | Feed | | | DP2 | DPf | Evacuation | | PE2 |
| 3 | ation | PE2 | | FeRP | Feed | | DP1 | DPf | Evacuation | Evacu |
| 4 | DPf | DP1 | Evacuation | | PE2 | | FeRP | Feed | DP2 | DP2 |
| 5 | DP1 | DP2 | DPf | Evacuation | | PE2 | PE1 | FeRP | Feed | Feed |

Feed to CO₂ VPSA ——> CO₂ depleted stream
CoC DP1 to PE1 with an A bed
CoC DP2 to PE2 with another of the A bed
Final Depressurisation to provide purge to another bed on evacuation
 or produce part of the product to be mixed with the evacuated product
CcC Evac to collect CO₂ product
CCC PE2 with an A Bed on DP2 to increase CO₂ recovery
CCC PE1 with an A bed on DP1 to increase CO₂ recovery
CcC RP by Feed Effluent

| Typical Step Time | |
|---|---|
| 2 | min |
| 1 | min |
| 1 | min |
| 1 | min |
| 2 | min |
| 1 | min |
| 1 | min |
| 1 | min |

| Feed |
|---|
| DP1 |
| DP2 |
| DPf |

| Evac. |
|---|
| PE2 |
| PE1 |
| FeRP |

CO$_2$ VPSA - 6 Beds, 3 Pressure Equalizations and Direct Mixing

Figure 21

CO₂ VPSA - 5 Beds, 2 Pressure Equalizations and Direct Mixing

| | | | | | | | | | | |
|---|---|---|---|---|---|---|---|---|---|---|
| 1 | Feed | | DP1 | DP2 | DPf | | Evacuation | | PE2 | PE1 | FeRP |
| 2 | PE1 | FeRP | | Feed | | | DP1 | DP2 | DPf | Evacuation | PE2 |
| 3 | ation | PE2 | PE1 | | FeRP | | Feed | | | DP1 | DPf |
| 4 | DPf | | Evacuation | | PE2 | PE1 | FeRP | | Feed | | DP2 |
| 5 | DP1 | DP2 | DPf | | Evacuation | | PE2 | PE1 | FeRP | Feed | |

Feed to CO₂ VPSA ⟶ CO₂ depleted stream
CoC DP1 to PE1 with a bed
CoC DP2 to PE2 with another bed
Final CcC DP to provide part of the CO₂ product to be mixed with the evacuated gas
CcC Evac to collect CO₂ product
CCC PE2 with a bed on DP2 to increase CO₂ recovery
CCC PE1 with a bed on DP1 to increase CO₂ recovery
CcC RP by Feed Effluent

| | Typical Pressure, psia | |
|---|---|---|
| | Start | End |
| Feed | 375 | 375 |
| DP1 | 375 | 251 |
| DP2 | 251 | 128 |
| DPf | 128 | 15 |
| Evac. | 15 | 4 |
| PE2 | 4 | 128 |
| PE1 | 128 | 251 |
| FeRP | 251 | 375 |

Figure 22

CO₂ VPSA - 8 Beds, 2 Pressure Equalizations and Direct Mixing
2 Beds on Feed, 3 beds on Evacuation

| Bed | | | | | | | | | | | | | | | | | | | | |
|---|---|---|---|---|---|---|---|---|---|---|---|---|---|---|---|---|---|---|---|---|
| A1 | FEED | FEED | DP1 | DP2 | DPf | Evacuation | Evacuation | Evacuation | PE2 | PE1 | RP |
| A2 | PE1 | RP | FEED | FEED | FEED | DP1 | DP2 | DPf | Evacuation | Evacuation | Evacuation | PE2 |
| A3 | Evc. | PE2 | PE1 | RP | FEED | FEED | FEED | DP1 | DP2 | DPf | Evacuation | Evacuation |
| A4 | Evac. | Evacuation | Evacuation | PE2 | PE1 | RP | FEED | FEED | FEED | DP1 | DP2 | DPf |
| A5 | DPf | Evacuation | Evacuation | Evacuation | PE2 | PE1 | RP | FEED | FEED | FEED | DP1 | DP2 |
| A6 | DP1 | DP2 | DPf | Evacuation | Evacuation | Evacuation | PE2 | PE1 | RP | FEED | FEED | FEED |
| A7 | FEED | DP1 | DP2 | DPf | Evacuation | Evacuation | Evacuation | PE2 | PE1 | RP | FEED | FEED |
| A8 | FEED | FEED | FEED | DP1 | DP2 | DPf | Evacuation | Evacuation | Evacuation | PE2 | PE1 | RP |

| Step | Description |
|---|---|
| Feed | Feed to CO₂ VPSA ---> CO₂ depleted stream |
| DP1 | CoC DP1 to PE1 with a bed |
| DP2 | CoC DP2 to PE2 with another bed |
| DPf | Final Depressurisation to provide part of the product to be mixed with the evacuated product |
| Evac. | CcC Evac to collect CO₂ product |
| PE2 | CCC PE2 with a Bed on DP2 to increase CO₂ recovery |
| PE1 | CCC PE1 with another bed on DP1 to increase CO₂ recovery |
| FRP | CoC Repressurization by Feed or CcC RP by Feed Effluent |

Figure 23

CO₂ VPSA - 11 Beds, 2 Pressure Equalizations and Direct Mixing
3 Beds on Feed, 2 Beds on Evacuation

| | | | | | | | | | | | |
|---|---|---|---|---|---|---|---|---|---|---|---|
| A1 | FEED | FEED | DP1 | DP2 | DPf | Evacuation | PE2 | PE1 | RP |
| A2 | RP | FEED | FEED | DP1 | DP2 | DPf | Evacuation | PE2 | PE1 |
| A3 | PE1 | RP | FEED | FEED | DP1 | DP2 | DPf | Evacuation | PE2 |
| A4 | PE2 | PE1 | RP | FEED | FEED | DP1 | DP2 | DPf | Evacuation |
| A5 | Evac | PE2 | PE1 | RP | FEED | FEED | DP1 | DP2 | DPf |
| A6 | Evacuation | | PE2 | PE1 | RP | FEED | FEED | DP1 | DP2 |
| A7 | DPf | Evacuation | | PE2 | PE1 | RP | FEED | FEED | DP1 |
| A8 | DP2 | DPf | Evacuation | | PE2 | PE1 | RP | FEED | FEED |
| A9 | DP1 | DP2 | DPf | Evacuation | | PE2 | PE1 | RP | FEED |
| A10 | FEED | DP1 | DP2 | DPf | Evacuation | | PE2 | PE1 | RP |
| A11 | FEED | FEED | DP1 | DP2 | DPf | Evacuation | | PE2 | PE1 |

Feed — Feed to CO₂ VPSA ---> CO₂ depleted stream
DP1 — CoC DP1 to PE1 with a bed
DP2 — CoC DP2 to PE2 with another bed
DPf — Final Depressurisation to provide part of the product to be mixed with the evacuated product
Evac. — CcC Evac to collect CO₂ product
PE2 — CCC PE2 with a Bed on DP2 to increase CO₂ recovery
PE1 — CCC PE1 with another bed on DP1 to increase CO₂ recovery
FRP — CoC Repressurization by Feed or CcC RP by Feed Effluent

US 8,535,417 B2

RECOVERY OF CARBON DIOXIDE FROM FLUE GAS

CROSS-REFERENCE TO RELATED APPLICATION

The present invention claims priority to U.S. provisional patent application Ser. No. 61/084,423, filed Jul. 29, 2008, the entire contents of which are incorporated herein by reference in its entirety.

FIELD OF THE INVENTION

The present invention relates to recovering carbon dioxide from streams such as flue gas containing carbon dioxide.

BACKGROUND OF THE INVENTION

Many processes for $CO_2$ removal from streams such as oxyfuel combustion flue gas result in low recovery of $CO_2$ due to vapor liquid equilibrium limitations of $CO_2$ mixtures, or due to other constraints. Any $CO_2$ that is not recovered ends up in a vent stream to be released to atmosphere. Interest is growing in recovering carbon dioxide to a higher degree of recovery, in a product stream having a higher carbon dioxide content.

BRIEF SUMMARY OF THE INVENTION

One aspect of the present invention is a method for recovering carbon dioxide comprising (A) providing a carbon dioxide-augmented feed gas by adding carbon dioxide to a flue gas produced by oxy-fuel combustion wherein the flue gas comprises at least carbon dioxide, water vapor, NOx and carbon monoxide, wherein the feed gas contains less than 0.1 vol. % hydrogen;

(B) compressing the feed gas and then drying the compressed feed gas by contacting it with an adsorbent to form moisture-laden adsorbent and a dried gaseous feed stream;

(C) subjecting the dried gaseous feed stream to a subambient-temperature recovery process, employing refrigeration provided by expansion of at least one liquid carbon dioxide product stream formed by said recovery process, and preferably employing only refrigeration provided by such expansion, to produce at least one gaseous carbon dioxide product stream and at least one gaseous carbon dioxide-containing vent stream;

(D) separating the vent stream into a carbon dioxide-rich stream and a carbon dioxide-depleted stream, by pressure swing adsorption or by physical or chemical absorption;

(E) expanding said carbon dioxide-depleted stream to form an expanded carbon dioxide-depleted stream;

(F) desorbing moisture from said moisture-laden adsorbent by contacting said moisture-laden adsorbent with said expanded carbon dioxide-depleted stream to form a moisture-laden carbon dioxide-depleted stream and then separating said moisture-laden carbon dioxide-depleted stream from said adsorbent; and (G) combining said carbon dioxide-rich stream with said flue gas to form said carbon dioxide-augmented feed gas.

Yet another aspect of the present invention is a method for recovering carbon dioxide comprising (A) providing a carbon dioxide-augmented feed gas by adding carbon dioxide to a flue gas produced by oxy-fuel combustion wherein the flue gas comprises at least carbon dioxide, water vapor, NOx and carbon monoxide, wherein the feed gas contains less than 0.1 vol. % hydrogen;

(B) compressing the feed gas and then drying the compressed feed gas by contacting it with an adsorbent to form moisture-laden adsorbent and a dried gaseous feed stream;

(C) subjecting the dried gaseous feed stream to a subambient-temperature recovery process, employing refrigeration provided by expansion of at least one liquid carbon dioxide product stream formed by said recovery process, to produce at least one gaseous carbon dioxide product stream and at least one gaseous carbon dioxide-containing vent stream;

(D) separating the vent stream into a carbon dioxide-rich stream and a carbon dioxide-depleted stream, by pressure swing adsorption or by physical or chemical absorption;

(E) optionally expanding said carbon dioxide-depleted stream to form an expanded carbon dioxide-depleted stream;

(F) desorbing moisture from said moisture-laden adsorbent by contacting said moisture-laden adsorbent with a stream of nitrogen and then purging nitrogen from said adsorbent by contacting said adsorbent with said expanded carbon dioxide-depleted stream, and then separating said carbon dioxide-depleted stream from said adsorbent; and (G) combining said carbon dioxide-rich stream with said flue gas to form said carbon dioxide-augmented feed gas.

Another aspect of the present invention is a method for recovering carbon dioxide comprising (A) providing a carbon dioxide-augmented feed gas by adding carbon dioxide to a flue gas produced by oxy-fuel combustion wherein the flue gas comprises at least carbon dioxide, water vapor, NOx and carbon monoxide, wherein the feed gas contains less than 0.1 vol. % hydrogen;

(B) compressing the feed gas and then drying the compressed feed gas by contacting it with an adsorbent to form moisture-laden adsorbent and a dried gaseous feed stream;

(C) subjecting the dried gaseous feed stream to a subambient-temperature recovery process, employing refrigeration provided by expansion of at least one liquid carbon dioxide product stream formed by said recovery process, to produce at least one gaseous carbon dioxide product stream and at least one gaseous carbon dioxide-containing vent stream;

(D) desorbing moisture from said moisture-laden adsorbent by contacting said moisture-laden adsorbent with said vent stream to form a moisture-laden vent stream and then separating said moisture-laden vent stream from said adsorbent;

(E) separating the vent stream into a carbon dioxide-rich stream and a carbon dioxide-depleted stream, by pressure swing adsorption or by physical or chemical absorption; and (F) combining said carbon dioxide-rich stream with said flue gas to form said carbon dioxide-augmented feed gas.

Another aspect of the present invention is apparatus for recovering carbon dioxide comprising (A) compressor apparatus capable of compressing carbon dioxide-containing gas to produce a compressed carbon dioxide-containing stream;

(B) dryer apparatus coupled to said apparatus for compressing to receive said compressed carbon dioxide-containing stream, and capable of reducing the water content of said compressed carbon dioxide-containing stream to produce a dried carbon dioxide-containing stream, wherein the dryer apparatus comprises one or more beds containing adsorbent for water which can alternately adsorb water and be desorbed of water by contact with a carbon dioxide-depleted stream produced in separation apparatus (D);

(C) processing apparatus coupled to said dryer apparatus to receive said dried carbon dioxide-containing stream, and capable of producing therefrom at least one gaseous carbon dioxide product stream and at least one gaseous carbon dioxide-containing vent stream, by subambient-temperature processing; and (D) separation apparatus coupled to said processing apparatus to receive said vent stream, and capable of producing from said vent stream a carbon dioxide-rich stream and a carbon dioxide-depleted stream by pressure swing adsorption or by physical or chemical absorption, and coupled to said compressor apparatus to pass said carbon dioxide-rich stream to said compressor apparatus, and coupled to said dryer apparatus so that said carbon dioxide-depleted stream can pass to said dryer apparatus.

A further aspect of the present invention is apparatus for recovering carbon dioxide comprising (A) compressor apparatus capable of compressing carbon dioxide-containing gas to produce a compressed carbon dioxide-containing stream;

(B) dryer apparatus coupled to said apparatus for compressing to receive said compressed carbon dioxide-containing stream, and capable of reducing the water content of said compressed carbon dioxide-containing stream to produce a dried carbon dioxide-containing stream, wherein the dryer apparatus comprises one or more beds containing adsorbent for water which can alternately adsorb water and be desorbed of water by contact with a vent stream from processing apparatus (C);

(C) processing apparatus coupled to said dryer apparatus to receive said dried carbon dioxide-containing stream, and capable of producing therefrom at least one gaseous carbon dioxide product stream and at least one gaseous carbon dioxide-containing vent stream, by subambient-temperature processing; and (D) separation apparatus coupled to said dryer apparatus to receive said vent stream, and capable of producing from said vent stream a carbon dioxide-rich stream and a carbon dioxide-depleted stream by pressure swing adsorption or by physical or chemical absorption, and coupled to said compressor apparatus so that said carbon dioxide-rich stream can pass to said compressor apparatus.

Preferably the at least one gaseous carbon dioxide product stream is then compressed, such as to facilitate its being fed into a pipeline for transfer to another location.

Also, preferably, the carbon dioxide-depleted stream is heated and treated to reduce its content of NOx and of carbon monoxide.

The various embodiments described in the following sections of this specification all constitute aspects of the present invention.

As used herein, "oxy-fuel combustion" means feeding fuel and feeding an oxidant stream having an oxygen content of at least 80 vol. % to a combustion process and combusting the fuel with oxygen, preferably with recycle to the combustion process of at least a portion of the gaseous products of the combustion. An oxyfuel combustion process generates a flue gas stream rich in $CO_2$.

As used herein, "pressure swing adsorption" means adsorbing a product, in this case carbon dioxide, from a gaseous feed stream onto a solid adsorbent at a first pressure, removing the feed stream depleted of the adsorbed product, and then desorbing the product at a second pressure different from the first pressure. As used herein, "vacuum pressure swing adsorption (VPSA)" means a pressure swing adsorption process in which the second pressure is subambient pressure.

As used herein, "physical absorption" means absorbing a product, in this case carbon dioxide, from a gaseous feed stream by passing the feed stream into a liquid which preferentially dissolves the carbon dioxide from the feed stream, removing the feed stream depleted of the absorbed product, and then recovering the carbon dioxide from the liquid such as by lowering the pressure over the liquid or by stripping the carbon dioxide out of the liquid, wherein the absorption of the carbon dioxide into the liquid does not involve a chemical reaction of the carbon dioxide.

As used herein, "chemical absorption" means absorbing a product, in this case carbon dioxide, from a gaseous feed stream by passing the feed stream into a liquid which contains a component with which the carbon dioxide preferentially reacts, removing the feed stream depleted of the absorbed product, and then recovering the carbon dioxide from the liquid such as by lowering the pressure over the liquid or by stripping the carbon dioxide out of the liquid, wherein the absorption of the carbon dioxide into the liquid involves a chemical reaction of the carbon dioxide with a component in the liquid.

As used herein, "NOx" means oxides of nitrogen, including but not limited to $NO$, $NO_2$, $N_2O$, and $N_3O_4$, and mixtures of oxides of nitrogen.

As used herein, "SOx" means $SO_2$, $SO_3$, and mixtures thereof.

BRIEF DESCRIPTION OF THE DRAWINGS

FIG. 15 shows the valve sequence for operation of the $CO_2$ VPSA unit shown in FIGS. 13 and 14.

FIG. 16 illustrates an alternative cycle step chart for a $CO_2$ VPSA unit having five beds, two pressure equalization steps and flow through the evacuating bed, useful in the present invention.

FIG. 21 illustrates yet another cycle step chart for a $CO_2$ VPSA unit having five beds, two pressure equalization steps and direct mixing, useful in the present invention.

FIG. 22 illustrates yet another cycle step chart for a $CO_2$ VPSA unit having eight beds, two pressure equalization steps and direct mixing in which two beds are continuously on feed and at least two beds are continuously under evacuation, useful in the present invention.

FIG. 23 illustrates a further cycle step chart for a $CO_2$ VPSA unit having eleven beds, two pressure equalization steps and direct mixing in which three beds are continuously on feed and two beds are continuously under evacuation, useful in the present invention.

DETAILED DESCRIPTION OF THE INVENTION

Figure 1:
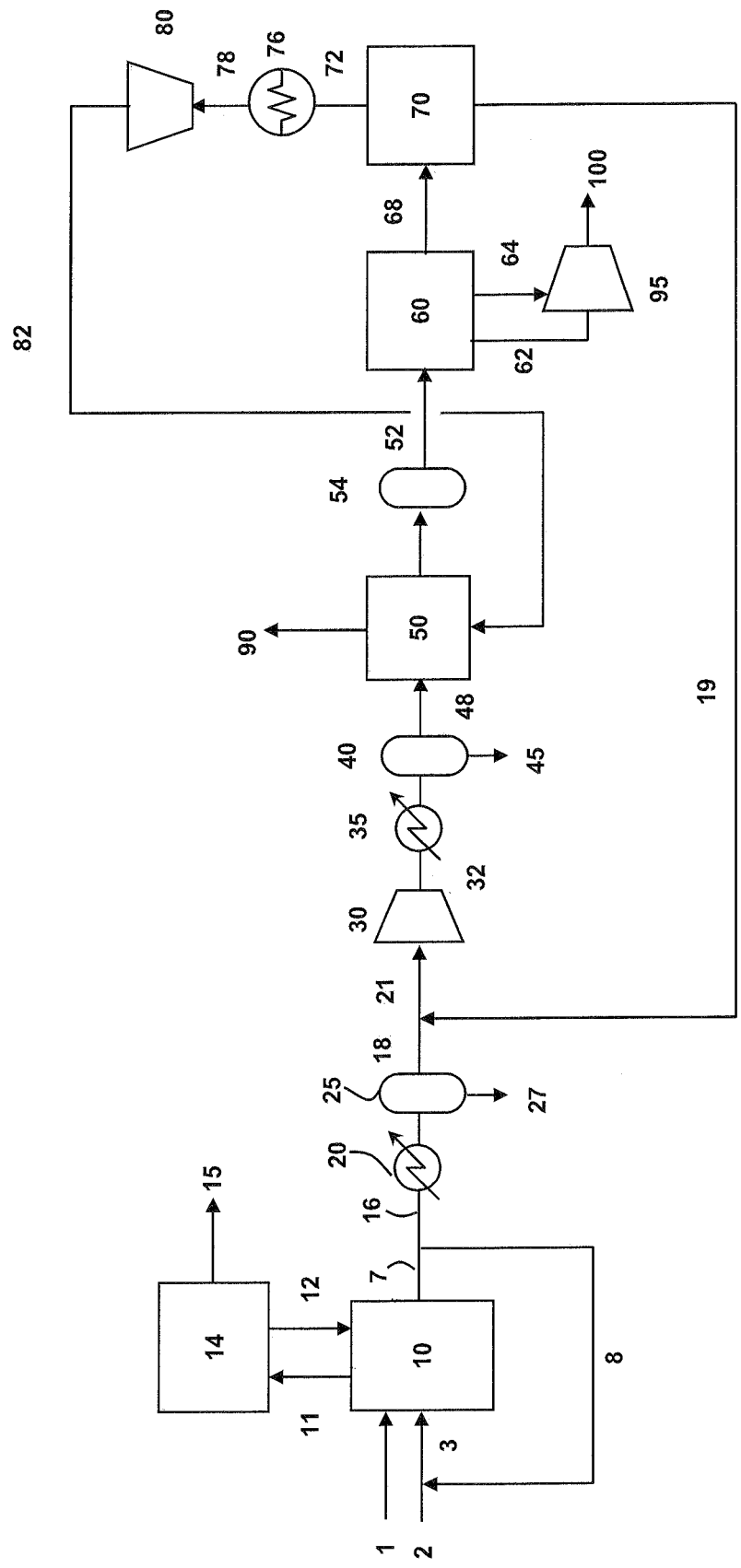
FIG. 1 is a diagram showing the incorporation of one embodiment of the method of the present invention into an oxy-fuel combustion system.

Referring to FIG. 1, oxidant stream 2 and flue gas recycle stream 8 are mixed to produce an oxidant feed stream 3.

Oxidant stream 2 preferably comprises at least 80 vol. % oxygen, and preferably at least 90 vol. % oxygen.

Fuel 1 and oxidant feed stream 3 are fed to the boiler 10 and combusted in boiler 10. The preferred fuel is pulverized coal. Other fuels that may be used include combustible (preferably hydrocarbonaceous) solids, liquids and gases, such as biomass, coke, fuel oil, and natural gas, coke oven gas. The purpose of oxyfuel combustion process could be manifold: direct heating of process fluid or materials, generation of steam to be used in process or production of steam for power generation. In the embodiment shown in FIG. 1, the thermal energy released from combustion of fuel 1 with oxygen in oxidant feed stream 3 can be used in the production of steam, preferably at multiple pressures, illustrated as stream 11 of steam which is expanded in steam turbine 14 to produce power 15. The expanded steam 12 is returned to boiler 10 after it is condensed.

The flue gas 7 from the boiler is split into two streams: flue gas recycle stream 8 and flue gas feed stream 16. The flue gas feed stream 16 is typically at ambient pressure and at a temperature of 200-400° F. The gas in stream 16 comprises $CO_2$, $H_2O$, $O_2$, $N_2$, argon, carbon monoxide (CO), SOx, NOx and other trace impurities. Hydrogen if present comprises no more than 0.1 vol. % of the feed stream. Stream 16 is cooled to ambient temperature in a cooler 20 either by indirect cooling using cooling water or fin-fan cooler or by direct contact with quench water. Any condensed water 27 is separated from the flue gas stream in a phase separator 25.

The cooled flue gas 18 is mixed with a recycled $CO_2$-rich stream 19 to form a $CO_2$-augmented feed stream 21. This feed stream 21 is compressed, such as in a multi-stage compressor 30 (typically including interstage cooler(s) and knockout drum(s) for condensed water), to a pressure of 150 to 800 psia, preferably to 300 to 500 psia. The compressed feed stream 32 is preferably cooled in a cooler unit 35 to a temperature typically of 40 to 120° F. The unit 35 could use cooling water or air to achieve a temperature in the range of 60 to 120° F. or cooling water or air in combination with chilled water to achieve a temperature in the range of 40 to 70° F. The stream is then passed through unit 40 which can be, for instance, a drum or phase separator, in which stream 45 of liquid water is removed and separated from the gas stream.

The compressed and cooled feed stream 48 is then introduced into a dryer unit 50 to reduce moisture content in the feed to less than 20 ppm, preferably less than 5 ppm, and more preferably less than 1 ppm. The dryer unit 50 is preferably comprised of two or more beds containing adsorbents for water vapor, with some of the beds being used at any given time to remove water vapor from the feed stream while other beds are being regenerated (by which is meant that adsorbed water vapor is being removed from the adsorbent).

Drying

The $CO_2$ depleted stream 72 from the VPSA unit 70 described below is used as a regeneration gas for the dryer beds.

Figure 4:
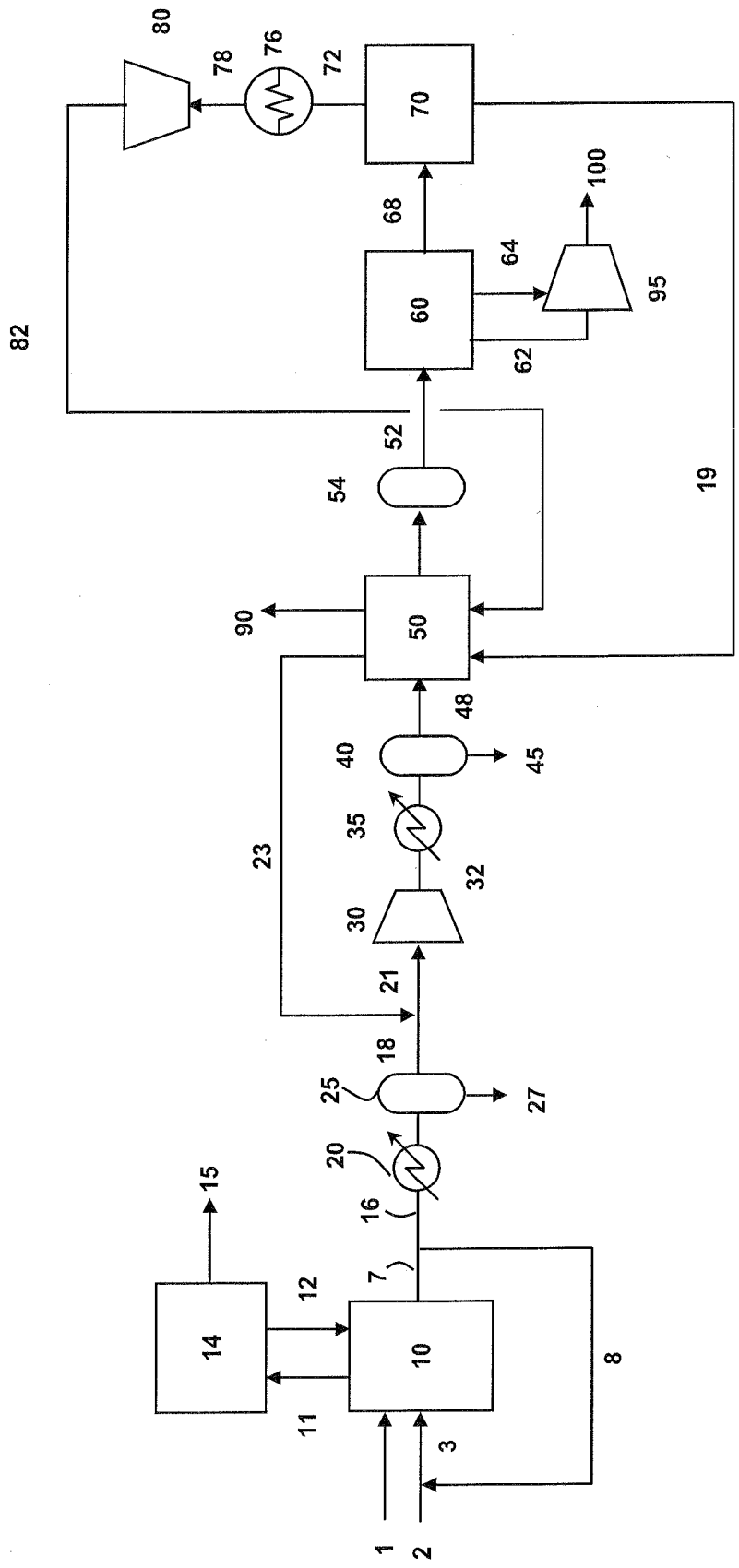
FIG. 4 is a diagram showing the incorporation of another embodiment of the method of the present invention into an oxy-fuel combustion system.
Figure 5:
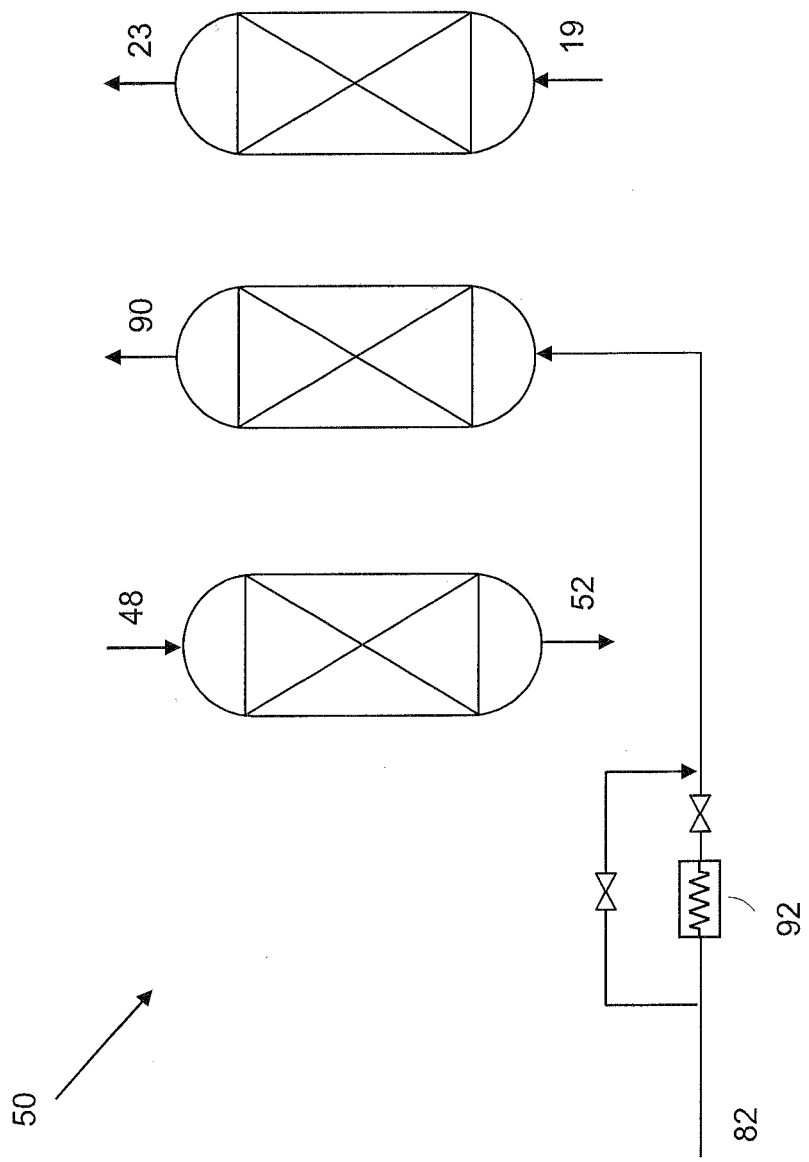
FIG. 5 is a diagram of an embodiment of a dryer unit useful in the method of the present invention.

One embodiment of a dryer unit is shown in FIG. 5. Here, at least three beds containing adsorbent material for water vapor, such as alumina or a molecular sieve, are used. One bed is always removing moisture from feed stream 48 and producing the dried feed stream 52. A second bed is being regenerated by stream 82 to remove moisture from the bed. In other embodiments described herein, stream 72 or 68, as the case may be, is used, but stream 82 is referred to herein. During the initial regeneration step, stream 82 is heated in heater 92 and then fed to heat the bed that is to be regenerated, and then after the bed is heated the stream 82 bypasses heater 92 and is directly passed to the said bed. A third bed which has undergone regeneration by stream 82, is further regenerated by $CO_2$-rich stream 19 (as also shown in FIG. 4). Stream 23 from this third bed is then recycled and mixed with the feed stream 18. After an interval of time, anywhere from 2 to 24 hours, the feeds to the beds are switched such that the bed that was on stream 48 will receive stream 82, the bed that was regenerated by stream 82 receives stream 19, and the bed that was regenerated by stream 19 now receives feed stream 48.

Figure 6:
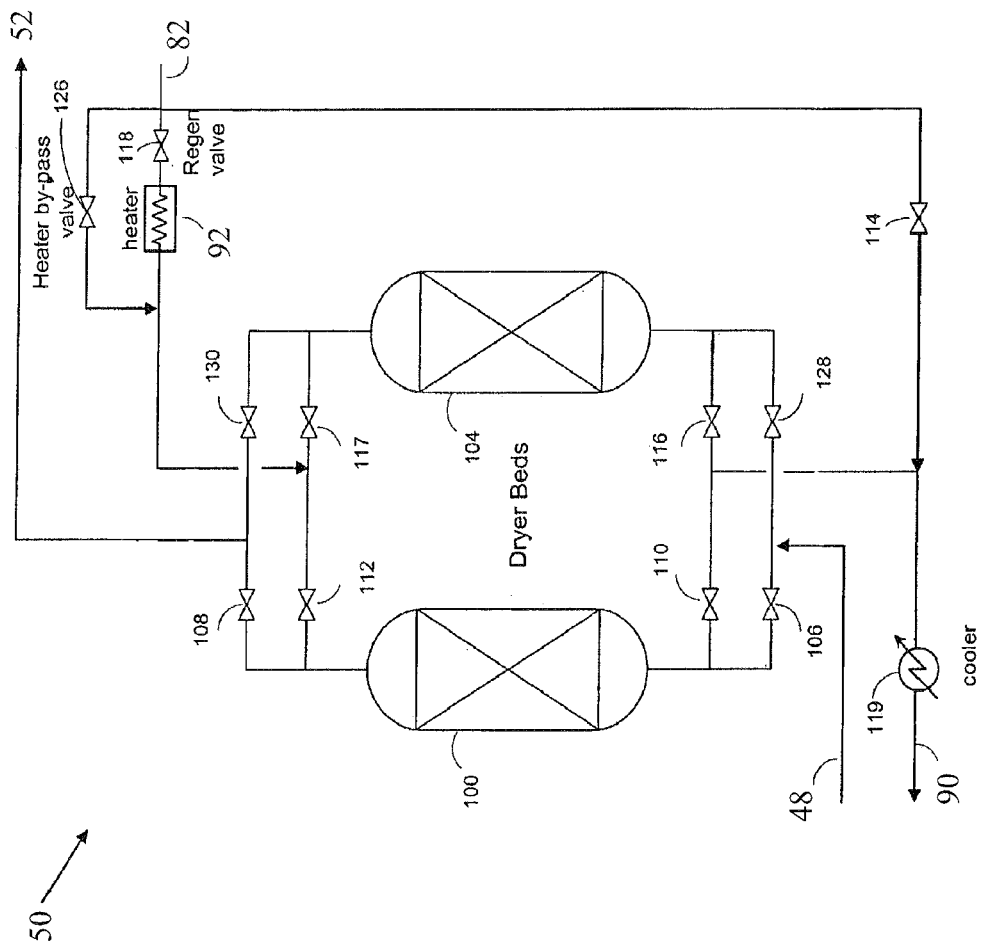
FIG. 6 is a diagram of another embodiment of a dryer unit useful in the method of the present invention.
Figure 7:
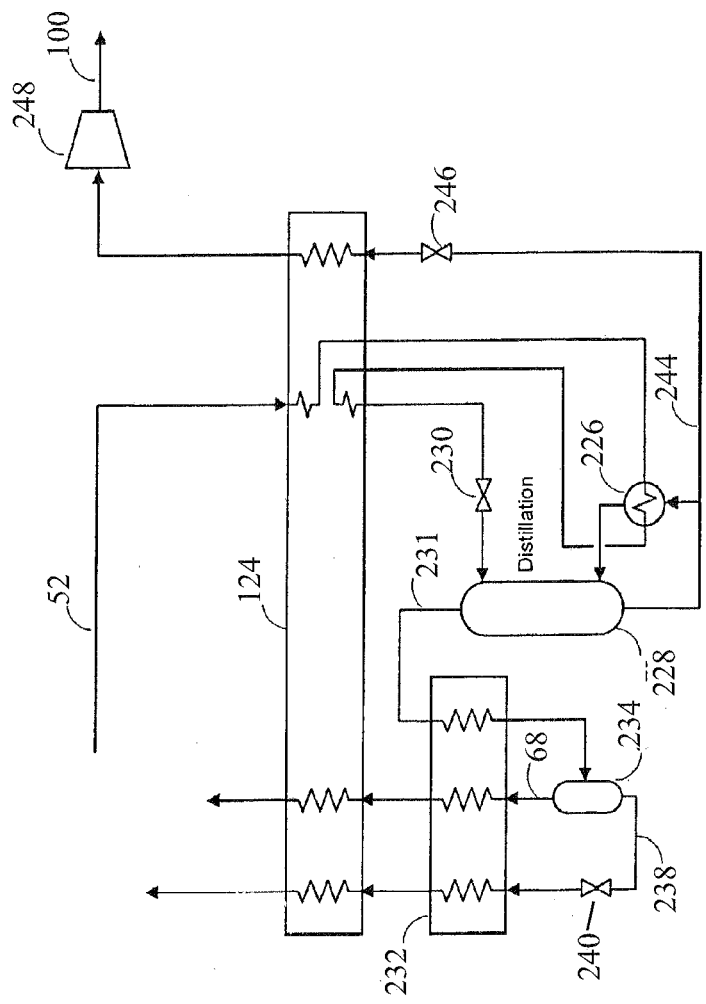
FIG. 7 is a diagram of an embodiment of a subambient-temperature processing unit useful in the method of the present invention.

With reference to FIG. 6, another embodiment of dryer 50 is illustrated in detail that is also adaptable to the arrangement shown in FIG. 5. In this embodiment, dryer 50 has two beds 100 and 104 containing an adsorbent for water vapor, for example alumina. When bed 100 is on-line adsorbing moisture from feed stream 48, valves 106 and 108 are open. Valves 110, 112, 128 and 130 are closed.

At this time, bed 104 is being regenerated; for this purpose, bed 104 is subject to depressurization, heating to desorb the previously adsorbed moisture, cooling and then repressurization to bring bed 104 back on line and adsorbing. During depressurization, dryer by-pass valve 114 is set in the open position and stream 82 (or, in other embodiments, stream 72 or 68) to be used for the regeneration bypasses bed 104 and is vented to atmosphere after optionally having been cooled in cooler 119. Valve 116 is set in an open position allowing bed 104 to depressurize. After bed 104 is depressurized, valve 114 is closed and valves 116, 117 and 118 are opened allowing stream 82 to pass through heater 92 to heat stream 82 to a temperature on the order of between about 300° F. to 600° F., and then pass through bed 104 and be discharged to atmosphere after optionally having passed through cooler 119. This causes moisture to desorb from the adsorbent within bed 104.

Bed 104 is then cooled by opening heater by-pass valve 126 and closing regeneration valve 118. After cooling, heater by-pass valve 126 and valves 116 and 117 are closed and dryer by-pass valve 114 opens. At this time, valve 128 is cracked open allowing some of the feed stream 48 to enter bed 104 for repressurization purposes. Once bed 104 is repressurized, valves 106 and 108 are closed and valves 128 and 130 are opened, allowing bed 104 to be brought back on line and bed 100 to be regenerated in the same manner as described herein for bed 104 and with the use of valves 110 and 112. The process is continuous to allow for continuous flow.

It is possible in some instances to not have a sufficient amount of the $CO_2$-depleted stream 82 (or streams 72 or 68, in other embodiments) to achieve all desired regeneration of dryer beds in unit 50. In that case, both $CO_2$-rich stream 19 and $CO_2$-depleted stream 72 from unit 70 can be fed to unit 50 to be used as regeneration gas for desorbing water from dryer beds. This embodiment is shown in FIG. 4.

When the amount of gas available from the $CO_2$-depleted stream 82, 72 or 68 is insufficient to fully desorb water from dryer beds, another solution is to use a stream of nitrogen such as from an air separation unit that supplies oxygen to stream 2 for oxyfuel combustion in boiler 10. During regeneration of a dryer bed, the nitrogen could be fed first for use in removing moisture from the bed, and stream 82 could be used next to purge out nitrogen from the bed.

The dried stream 52 from dryer unit 50 is optionally but preferably passed through stage 54 in which mercury is removed from the stream by any of the techniques known in this technical field, such as adsorption onto activated carbon.

Subambient-Temperature Processing

The dried feed stream 52 is fed to stage 60 for separation of $O_2$, $N_2$ and argon, as well as NOx and CO if present, from the $CO_2$. Preferably the process used in this stage employs subambient-temperature processing, such as: partial condensation followed by distillation; partial condensation followed by phase separation; first partial condensation followed by phase separation followed by further partial condensation of the gas stream from the first partial condensation followed by further phase separation.

Examples of preferred subambient-temperature processes are illustrated in FIGS. 7-12. Referring first to FIGS. 7-10, the dried feed stream 52 is introduced into a main heat exchanger 124 in which it is partly cooled and then introduced into a reboiler 226 that serves to produce boil up or initiate an ascending vapor phase within distillation column 228. Dried feed stream 52 is then again introduced into main heat exchanger 124 in which it is fully cooled to at least partially liquefy carbon dioxide in stream 52. The stream 52 is then introduced through an expansion valve 230 into column 228 to initiate a descending liquid phase within such column.

In a manner well known in this art, column 228 preferably has structured packing to contact the ascending vapor phase flowing up through the packing with a descending liquid flow of the liquid phase. Other vapor-liquid contacting elements known in the art could be used such as sieve trays. As a result of the contact, the descending liquid phase becomes evermore rich in carbon dioxide, the less volatile component and the ascending vapor phase becomes evermore rich in impurities that have a higher volatility than the carbon dioxide. Column 228 produces a carbon dioxide-lean column overhead stream 231 and a carbon dioxide-rich, liquid column bottom stream 244.

Column overhead stream 231 from column 228 is then passed through an auxiliary heat exchanger 232 so that the carbon dioxide in overhead stream 231 is at least partially liquefied. The carbon dioxide overhead stream 231 is then passed through a phase separator 234 to produce a carbon dioxide-depleted vapor stream 68 and a carbon dioxide-rich liquid stream 238. Carbon dioxide-rich liquid stream 238 is expanded through an expansion valve 240. Expansion through valve 40 provides refrigeration for the partial liquefaction of carbon dioxide overhead stream 231. Expanded stream 238 and stream 68 are passed through auxiliary heat exchanger 232 and through main heat exchanger 124.

Stream 68 is passed to stage 70 which is described herein.

Stream 238 after having passed through main heat exchanger 124 can be combined with stream 68 and fed to stage 70, or stream 238 can be recycled (not shown) to the inlet of an appropriate stage of a compressor 30.

A carbon dioxide product stream 244 as a liquid can be extracted from column 228 and is composed of carbon dioxide-rich liquid column bottoms. The carbon dioxide product stream 244 can then be expanded in an expansion valve 246 to generate refrigeration for the process and can thereafter be vaporized within main heat exchanger 124 and compressed in a product compressor 95 to produce a compressed carbon dioxide stream 100 as the carbon dioxide product. The product compressor 95 could be a multi-stage compressor with interstage cooling.

Figure 8:
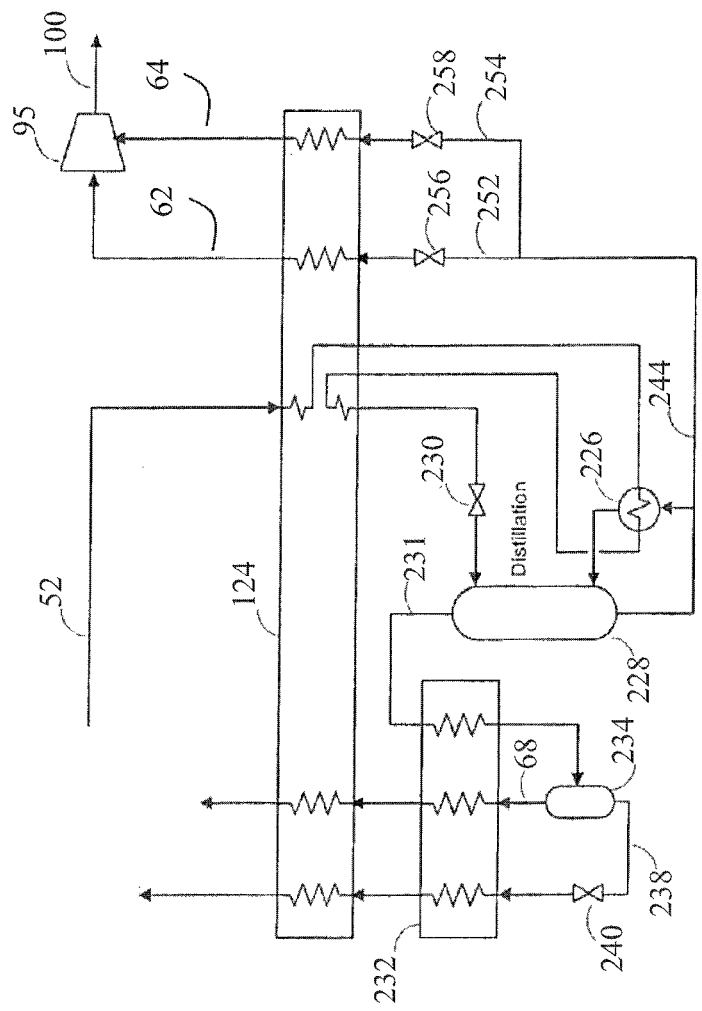
FIG. 8 is a diagram of another embodiment of a subambient-temperature processing unit useful in the method of the present invention.

In the embodiment depicted in FIG. 8, carbon dioxide product stream 244 is not expanded all at the same pressure but is split into subsidiary streams 252 and 254 and at least the subsidiary stream 252 is expanded by the use of expansion valve 256 to a pressure lower than the pressure to which stream 254 is expanded. Streams 252 and 254 are expanded to their respective expanded pressures by the use of expansion valves 256 and 258, respectively, which have different orifices for such purposes. Both subsidiary streams 252 and 254 are then vaporized in main heat exchanger 124. The resultant lower pressure subsidiary stream 62 is introduced into the inlet of product compressor 95. The higher pressure subsidiary stream 64 is introduced into an intermediate stage of product compressor 95. The compressed product stream 100 is recovered from compressor 95.

Figure 9:
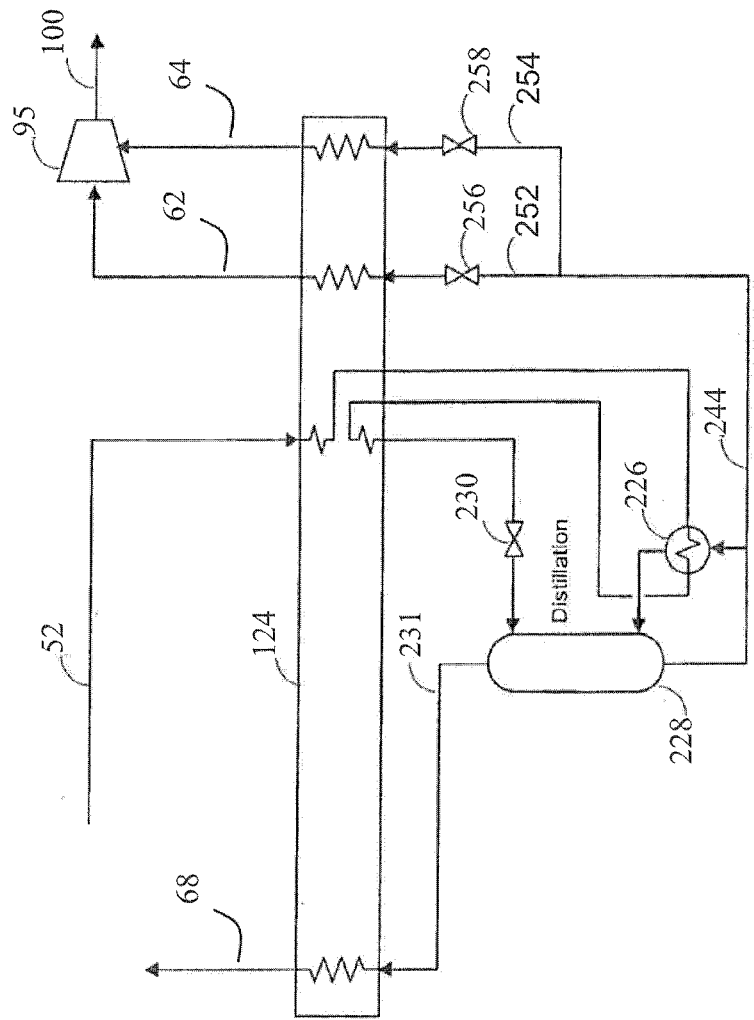
FIG. 9 is a diagram of another embodiment of a subambient-temperature processing unit useful in the method of the present invention.

In the embodiment depicted in FIG. 9, column overhead stream 231 can simply be passed into main heat exchanger 124. This recovers refrigeration from column overhead stream 231.

Figure 10:
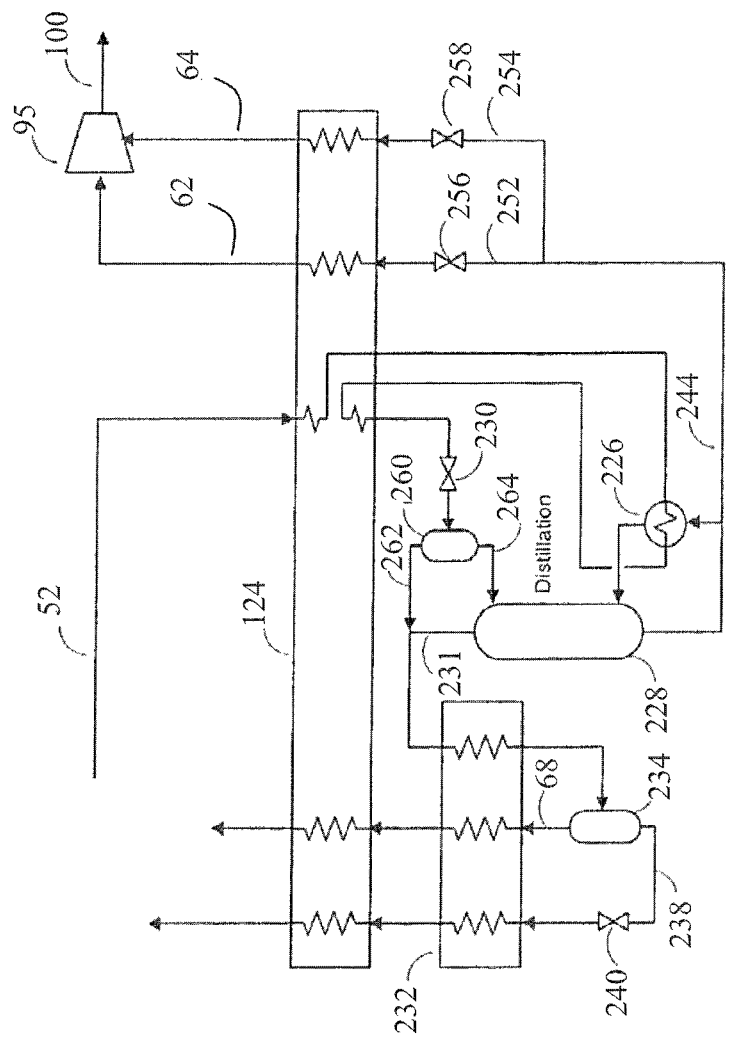
FIG. 10 is a diagram of another embodiment of a subambient-temperature processing unit useful in the method of the present invention.

In the embodiment depicted in FIG. 10, feed stream 52 after expansion through valve 230 is introduced into a phase separator 260 to produce a vapor phase stream 262 and a liquid phase stream 264. Liquid phase stream 264 is introduced into column 228 to produce the carbon dioxide containing column bottoms 244 and vapor phase stream 231 which can be combined with stream 262 and passed through auxiliary heat exchanger 232 as described in connection with the embodiment of the invention described with respect to FIG. 7. Phase separator 260 could be used in any embodiment of the present invention.

Figure 11:
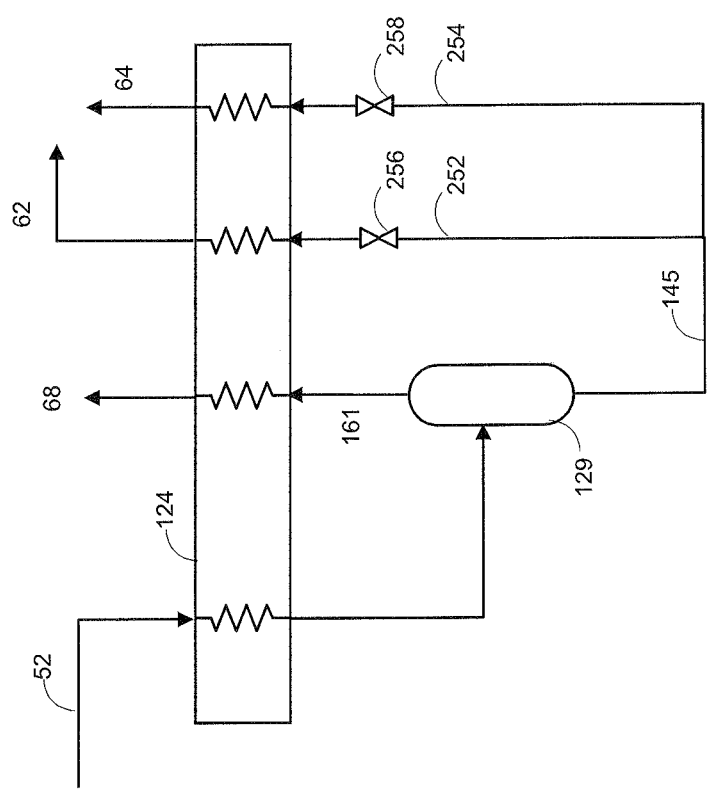
FIG. 11 is a diagram of another embodiment of a subambient-temperature process useful in the method of the present invention.

FIG. 11 shows an alternative configuration of subambient-temperature processing based on partial condensation followed by one stage of phase separation. Feed stream 52 is cooled in a heat exchanger 124 against cold streams being warmed. Feed stream 52 is cooled to 0° F. to −70° F. to partially condense it and is then fed to a phase separator 129. A $CO_2$ product stream with >90% purity (by volume), preferably >95% purity, is withdrawn as a liquid stream 145. A $CO_2$-lean stream from the phase separator 129 is recovered as a gaseous stream 161. The liquid stream 145 is expanded through at least one expansion valve 256. It will be advantageous to split stream 145 into two separate streams 252 and 254 and expand them through two expansion valves 256 and 258 to two different pressures. The pressure to which the $CO_2$ liquid product is expanded is usually 50 to 300 psia lower than the pressure of feed 52 to the subambient-temperature processing unit. The resultant expanded $CO_2$ product streams 62 and 64 and gaseous stream 161 are warmed through heat exchanger 124. The $CO_2$-lean stream 68 is then fed to adsorption based or absorption based separation in unit 70. The $CO_2$ product streams 62 and 64 can be compressed and recovered as described herein.

Figure 12:
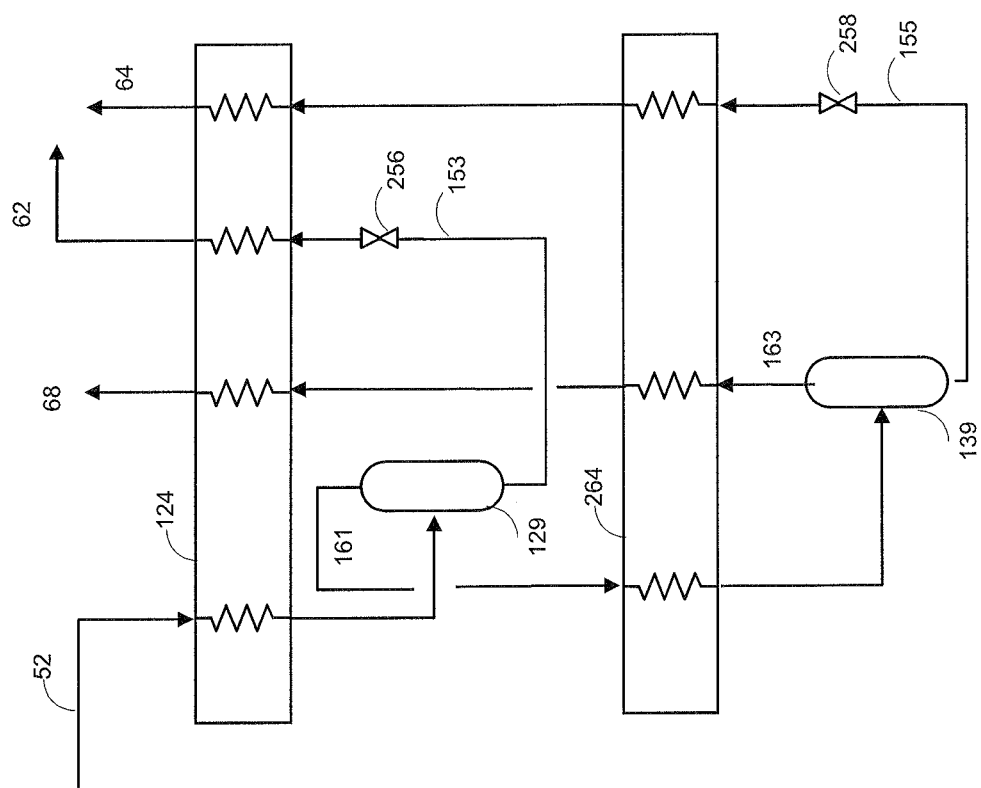
FIG. 12 is a diagram of another embodiment of a subambient-temperature process useful in the method of the present invention.

FIG. 12 shows another embodiment of subambient-temperature processing where partial condensation is followed by two stages of phase separation. The feed stream 52 is first cooled in heat exchanger 124 to 0° F. to −40° F. to cause partial condensation, and is then fed to a phase separator 129. The first $CO_2$ product is recovered as liquid stream 153 and expanded through expansion valve 256. The vapor stream 161 from phase separator 129 is further cooled in another heat exchanger 264 to −20° F. to −70° F. to partially condense it. The partially condensed stream 161 is then fed to another phase separator 139. A second product $CO_2$ stream is recovered as liquid stream 155 which is expanded through expansion valve 258. Further $CO_2$-depleted vapor stream 163 is recovered from the phase separator 139. The expanded second $CO_2$ product stream 155 and vapor stream 163 are warmed through heat exchangers 264 and 124 and the expanded first $CO_2$ product stream 153 is warmed through heat exchanger 124. The $CO_2$-lean stream 68 and the two $CO_2$ product streams 62 and 64 are further processed as described herein.

Purified $CO_2$ is obtained from the subambient-temperature processing in one stream or in two streams such as streams 62 and 64 which may be at the same pressure or at two different pressures. The purified $CO_2$ stream or streams can if desired be compressed in e.g. a multistage compressor 95 to a pressure of 500 to 3000 psia, preferably to 1500 to 2500 psia. Such compression is desirable for pipeline transport or other disposition of the stream. The purity of $CO_2$ is generally greater than 95%. Using the subambient-temperature process, 60-93 percent of $CO_2$ contained in stream 52 is recovered as product $CO_2$ in stream 100. The extent of recovery depends on the concentration of $CO_2$ in stream 52. The remaining $CO_2$ is contained in vent stream 68, which is usually at pressure close to the pressure of feed stream 52. The concentration of $CO_2$ in vent stream 68 is usually in the 25-40% range.

Processing of Stream 68 or 69

As illustrated in FIGS. 1-4, stream 68 is then fed to unit 70 where it undergoes further separation, by adsorption, by physical absorption or by chemical absorption. Unit 70 produces a $CO_2$-rich stream 19 at 15-20 psia and the $CO_2$ depleted stream 72 at essentially the pressure of stream 68 that was fed to unit 70. The stream 72 is preferably heated to 300-700° F. in a heater 76 and then expanded to 15 to 20 psia in the expander 80 to recover power. Preferably, the temperature of heated stream 78 is such that after expansion, the temperature of the expanded stream is close to the temperature of stream 48 (40-120° F.). The expanded stream 82 is used as an adsorbent bed regeneration gas in the dryer unit 50. Moisture laden stream 90 from the dryer unit is vented to atmosphere.

Figure 2:
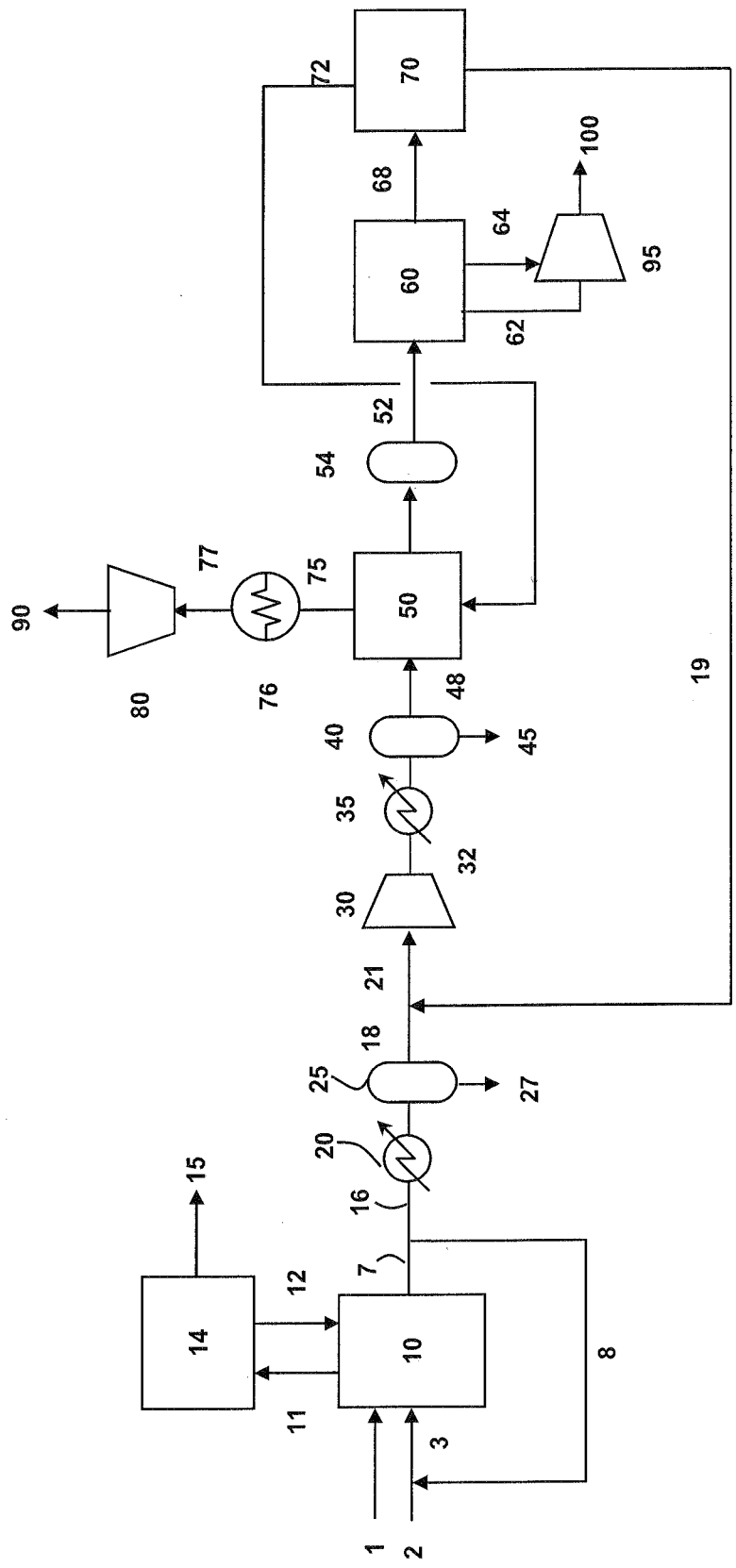
FIG. 2 is a diagram showing the incorporation of another embodiment of the method of the present invention into an oxy-fuel combustion system.

Alternatively, stream 72 is heated in heater 76 and expanded in expander 80 after, rather than before, it is passed through dryer unit 50 for regeneration of dryer beds. This alternative embodiment is shown in FIG. 2, wherein stream 72 from unit 70 is passed through dryer unit 50 for regeneration of dryer beds and emerges from unit 50 as stream 75 which is heated to 300-700° F. in heater 76 to form heated stream 78 which is then expanded to 15 to 20 psia in expander 80 to recover power.

The $CO_2$-rich stream 19 is recycled and mixed with flue gas from boiler 10. By recovering additional $CO_2$ from vent stream 68 by processing in unit 70 and recycling it, the overall $CO_2$ recovery can be increased to the range of 96-99%. Thus, the product stream 100 contains 96% to 99% of the $CO_2$ contained in the flue gas stream 18.

Adsorption

In this embodiment, vent stream 68 is passed on to a vacuum pressure swing adsorption (VPSA) unit 70. The VPSA unit contains multiple beds containing adsorbent that selectively adsorbs $CO_2$. The VPSA unit produces a $CO_2$-rich stream 19 at 15-20 psia and the $CO_2$ depleted stream 72 at essentially the pressure of stream 68 that was fed to the VPSA. The stream 72 is preferably heated to 300-700° F. in a heater 76 and then expanded to 15 to 20 psia in the expander 80 to recover power. Preferably, the temperature of heated stream 78 is such that after expansion, the temperature of the expanded stream is close to the temperature of stream 48 (40-120° F.). The expanded stream 82 is used as an adsorbent bed regeneration gas in the dryer unit 50. Moisture laden stream 90 from the dryer unit is vented to atmosphere.

After the $CO_2$ concentration is increased by multiple depressurizations in unit 70 it can be used to produce the $CO_2$ product by further pressure reduction. For some adsorbents, depressurization from high to low pressure increases $CO_2$ concentration in the adsorbent bed. This step in the process can be used to eliminate several process steps as described in the prior art. Consequently, several pieces of rotating machinery (e.g., rinse compressor, purge compressor, recycle compressor) and associated power requirements can be eliminated, thus providing a process and system that enhances operation and improves efficiency.

Figure 17:
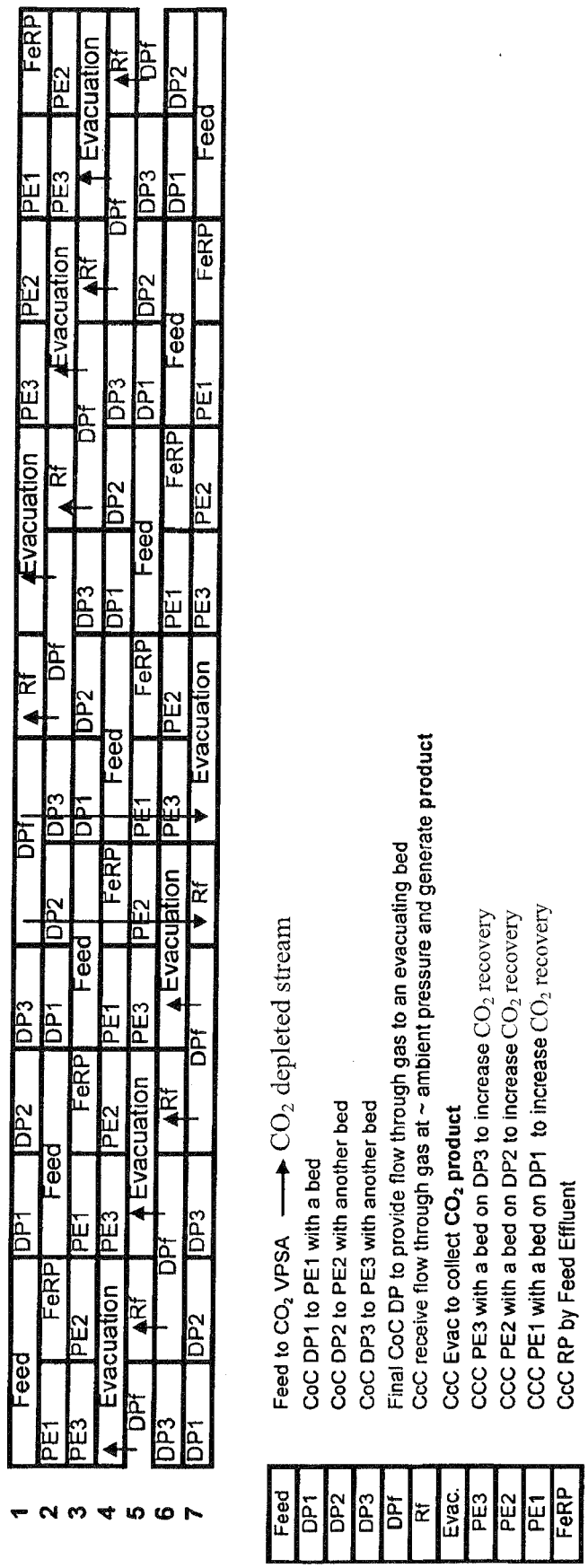
FIG. 17 illustrates another alternative cycle step chart for a $CO_2$ VPSA unit having seven beds, three pressure equalization steps and flow through the evacuating bed, useful in the present invention.

In one embodiment of VPSA stage 70, the processes provide for flow through the evacuating bed (see for example, FIGS. 13-17). The flow through embodiments can be accomplished using a varying number of beds and pressure equalization steps. For example, flow through the evacuating bed can be accomplished with six beds and three pressure equalization steps (FIGS. 13-17). Alternatively, flow through the evacuating bed can be accomplished with five beds and two pressure equalization steps (FIG. 16) or seven beds and three pressure equalization steps (FIG. 17). At any time during any of these processes, the beds will be in one of the following categories of steps: feed, depressurizations, evacuation, pressure equalizations, and repressurization. In addition, a purge step can be included in the cycle for the embodiment shown in FIG. 17.

Figure 18:
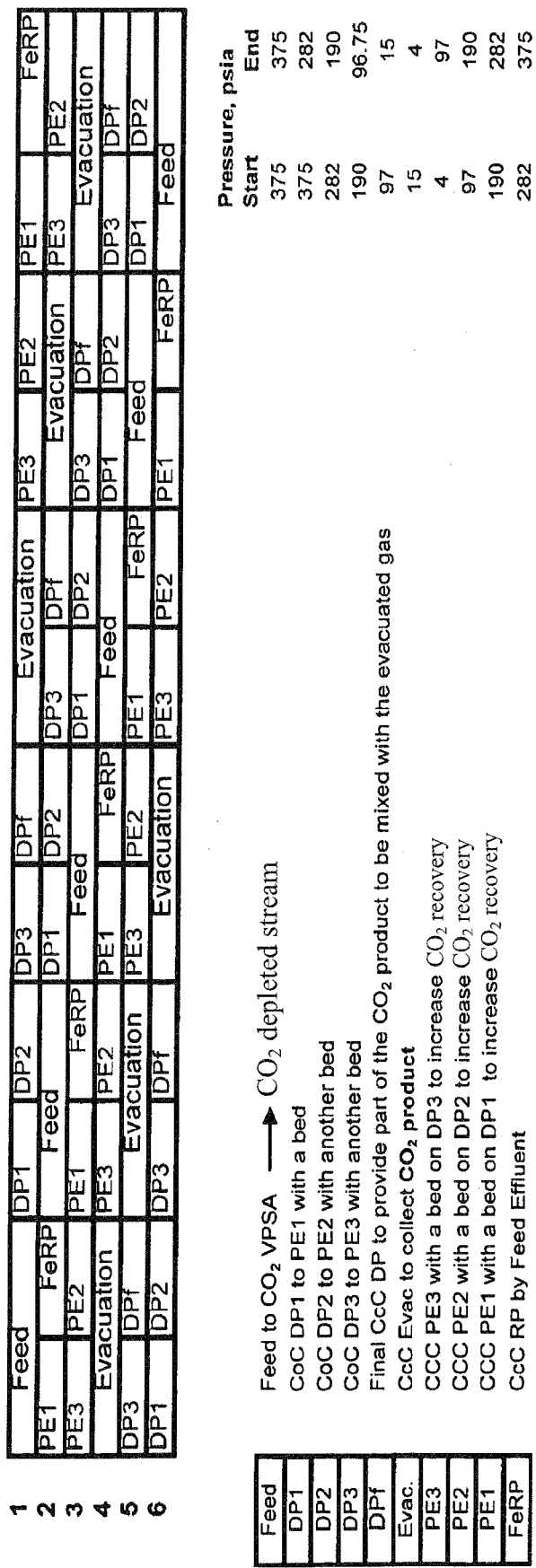
FIG. 18 illustrates a further alternative cycle step for a $CO_2$ VPSA unit having six beds, three pressure equalization steps and direct mixing, useful in the present invention.
Figure 19:
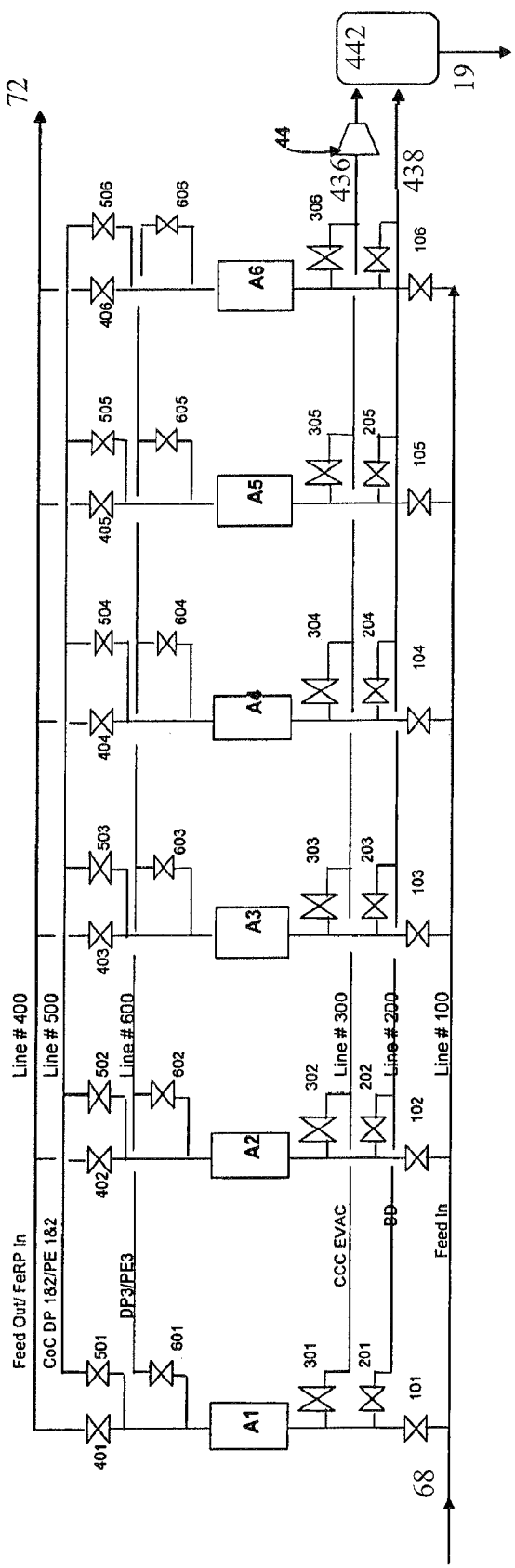
FIG. 19 shows a schematic drawing for the $CO_2$ VPSA unit of FIG. 18.
Figure 20:
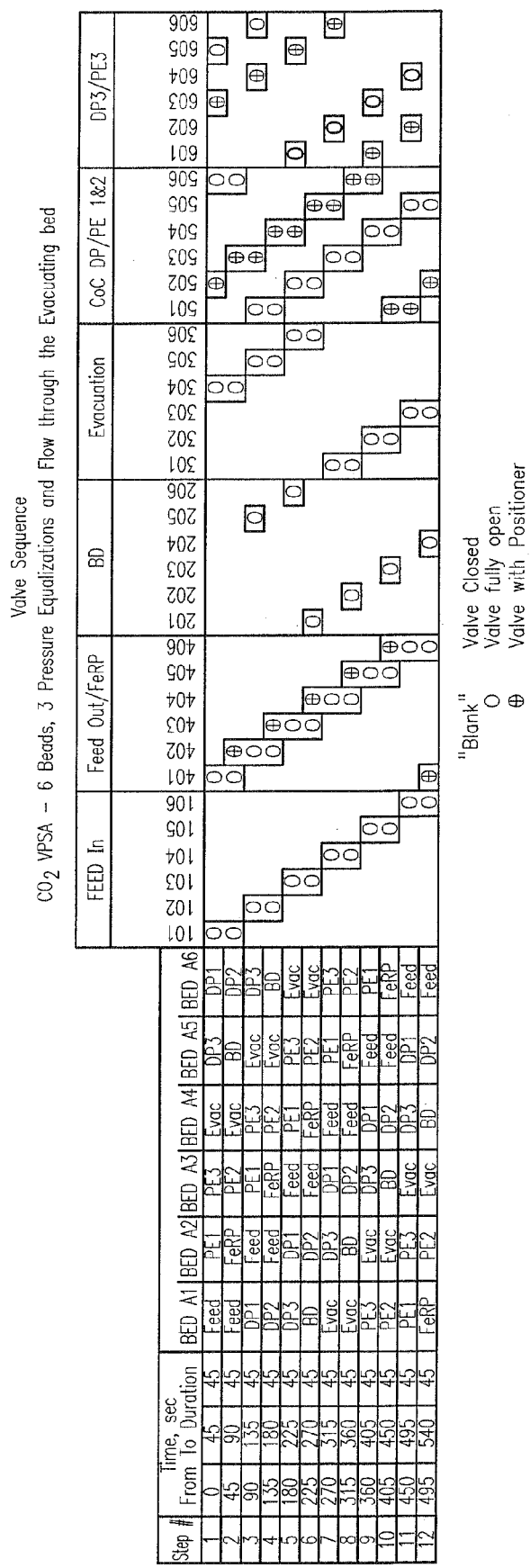
FIG. 20 shows the valve sequence for operation of the $CO_2$ VPSA unit shown in FIGS. 18 and 19.

In other alternative embodiments, the $CO_2$ product produced during the final depressurization step (DPf) is not passed through another bed under evacuation. Rather, this stream is mixed directly with the stream from the evacuating bed. In one preferred and exemplary embodiment, this can be accomplished with a $CO_2$ VPSA unit having six beds and three pressure equalization steps (FIGS. 18-20). In other embodiments, this can be accomplished by using a $CO_2$ VPSA unit having five beds and two pressure equalization steps (FIG. 21). At any time during any of these processes, the beds will be in one of the following categories of steps: feed, depressurizations, evacuation, pressure equalizations, and repressurization.

Combinations of flow through and direct mixing can also be used. In such embodiments, a portion of the stream produced during the depressurization step (DPf) flows through the bed under evacuation and the remainder is directly mixed with the stream exiting the bed under evacuation.

In embodiments where increased plant capacity is desirable, the embodiments shown in FIGS. 22 and 23 can be utilized. More specifically, FIG. 22 shows a cycle step chart for an embodiment of the present invention in which two pressure equalizations and eight beds are used with direct mixing. In this embodiment, two beds are continuously on feed and at least two beds are continuously under evacuation. This arrangement is expected to allow for an increase in the capacity of the plant. FIG. 23 illustrates a cycle step chart for an embodiment of the present invention in which two pressure equalizations and eleven beds are used with direct mixing. In this embodiment, three beds are continuously on feed and two beds are continuously under evacuation. This arrangement is also expected to allow for an increase in the capacity of the plant. At any time during any of these processes, the beds will be in one of the following categories of steps: feed, depressurizations, evacuation, pressure equalizations, and repressurization.

In any of the embodiments, each bed is preferably packed with at least two layers of adsorbents. The type and sizing of the adsorbent layer toward the feed end (i.e. a water-selective adsorbent layer) in the bed is selected to remove moisture in the feed stream such that any residual moisture does not deteriorate the performance of the main (i.e., $CO_2$-selective) adsorbent layer. The water-selective adsorbent layer is also preferably capable of removing impurities (e.g., trace amounts of sulfur or heavy hydrocarbon compounds) from the feed stream, to the extent such impurities are present. The main, second adsorbent layer (i.e., the $CO_2$-selective adsorbent layer) is used for selectively adsorbing $CO_2$ from the feed stream after sufficient moisture has been removed.

For the first adsorbent layer (i.e. the water-selective adsorbent layer), adsorbents such as activated alumina, silica gel or zeolite molecular sieve are preferred. These adsorbents are intended to be illustrative and other adsorbents capable of removing sufficient moisture are also suitable for use in accordance with the present invention. Preferred characteristics for such adsorbent(s) include: high crush strength capabilities, high attrition resistance, large bulk density, low inter-particle void, high heat capacity, large thermal conductivity, low-pressure drop and stable in liquid water.

The main layer of adsorbent (i.e., the $CO_2$-selective adsorbent layer) following the water-selective adsorbent layer preferably has the following characteristics: high selectivity, high working capacity, fast kinetics and low heat of adsorption. Typical examples of such adsorbents include, but are not limited to: are NaY, HY, NaX, silica gel, and activated carbon. Other desired physical properties of the main layer adsorbent (i.e. the $CO_2$-selective layer) include: high crush strength, high attrition resistance, large bulk density, low inter-particle void, high heat capacity, large thermal conductivity and low-pressure drop during the feed and evacuation steps.

Those skilled in the art will appreciate that a composite mixed layer containing both adsorbents could be used in the present invention so long as the characteristics of the adsorbents are satisfied.

Figure 13:
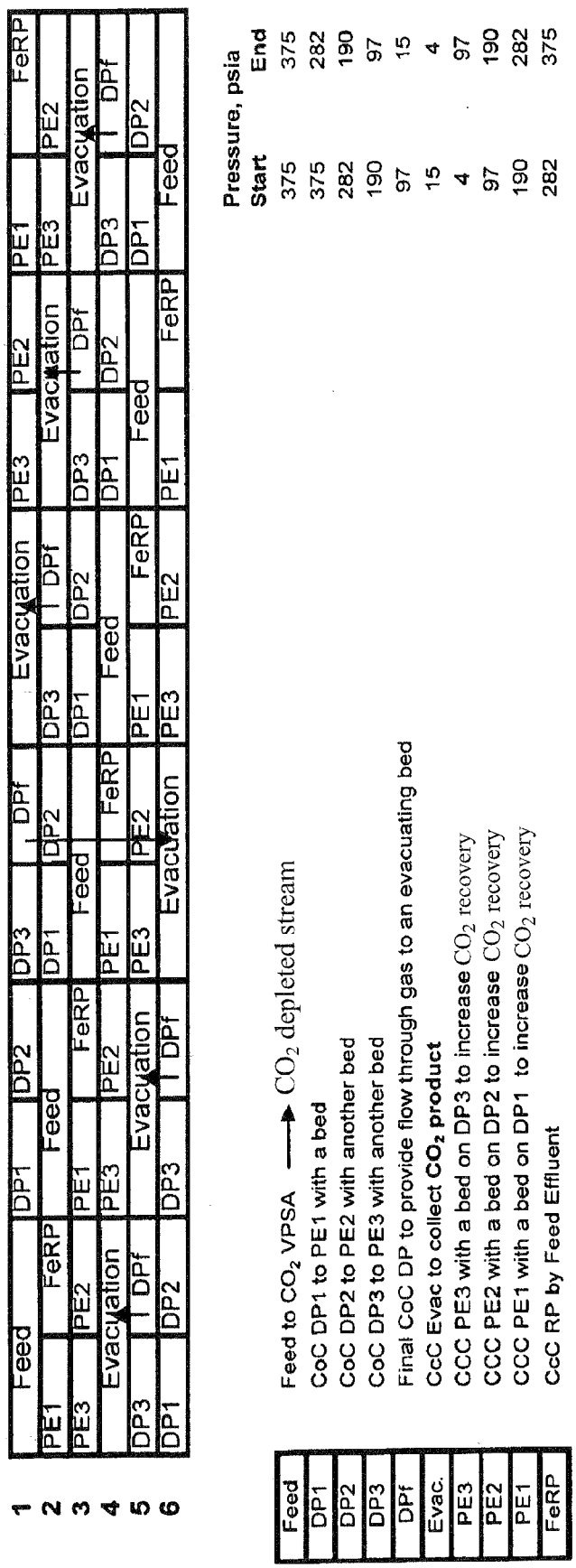
FIG. 13 illustrates a cycle step chart for a $CO_2$ VPSA unit having six beds, three pressure equalization steps and flow through the evacuating bed, useful in the present invention.
Figure 14:
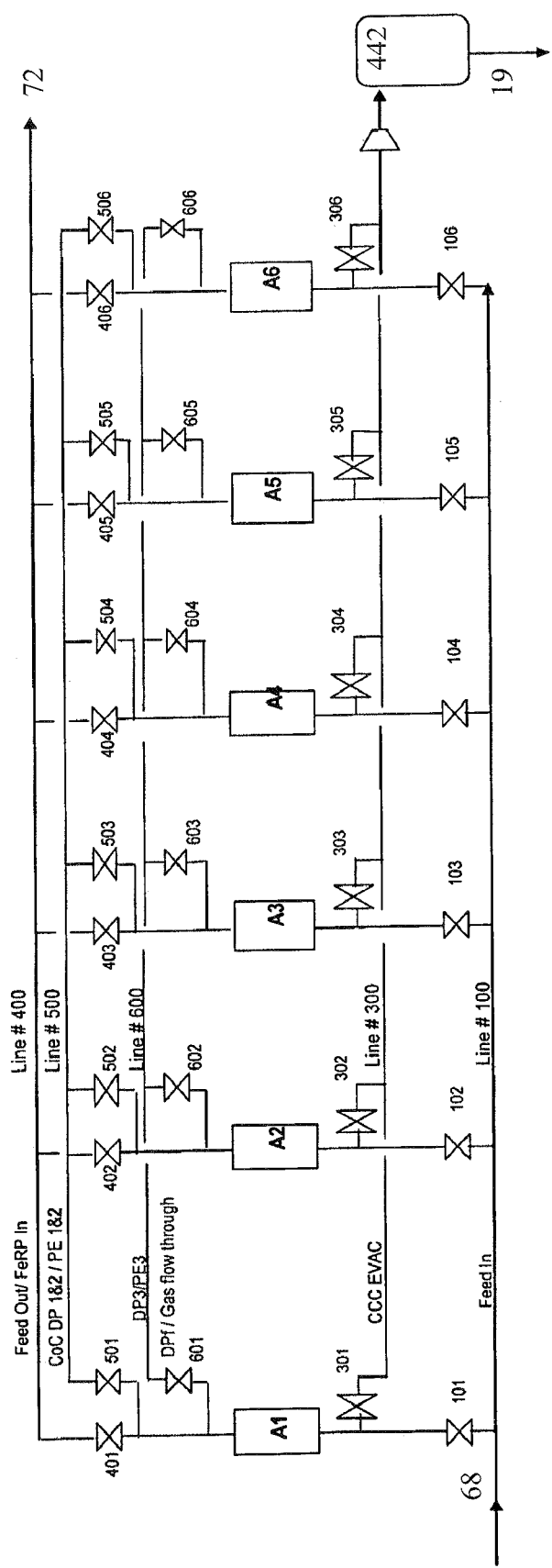
FIG. 14 shows a schematic drawing for a $CO_2$ VPSA unit of FIG. 13.
Figure 15:
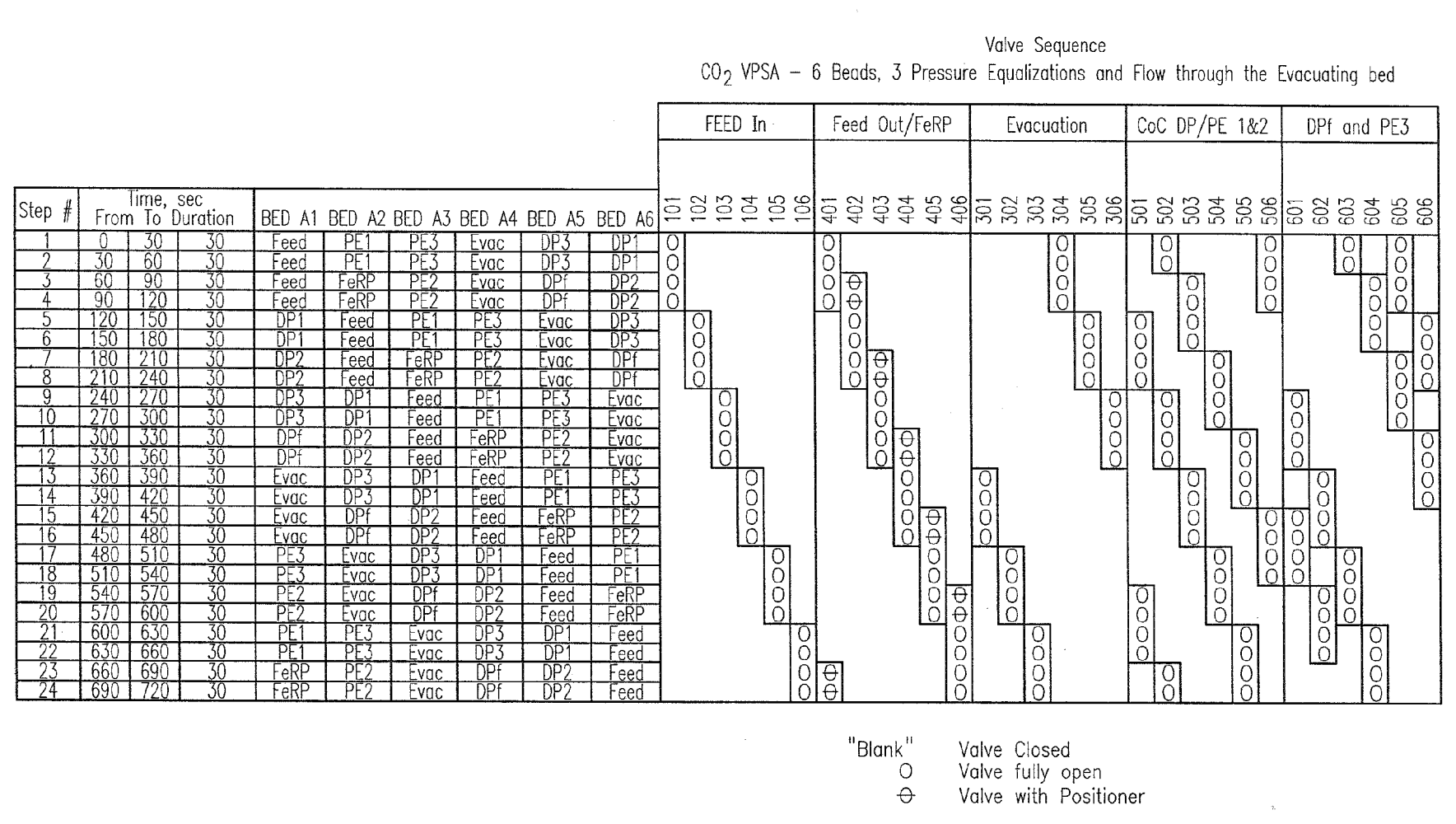

Referring now to FIGS. 13-15, a first embodiment of the present invention having six beds (A1-A6) and using ten steps with flow through the evacuating bed to produce enriched $CO_2$ is illustrated. The process steps include:

1. Feed Step. Feed stream 68 containing carbon dioxide at a high pressure between about 100-500 psia (for example, about 375 psia) is fed to the $CO_2$ PSA unit. After a predetermined time or after $CO_2$ breakthrough from the bed on the feed 68, the feed step is terminated.

2. Co-Current (CoC) Depressurization 1 (DP1). The $CO_2$ VPSA bed, which has finished the feed step is now at high feed pressure (e.g., 100-500 psia), is depressurized to a medium pressure (e.g., 80-400 psia) in a direction the same (shown in FIG. 13) or opposite (not shown in FIG. 13) as the feed flow.

3. Co-Current (CoC) Depressurization 2 (DP2). The $CO_2$ VPSA bed, which is now at some medium pressure (e.g., 80-400 psia), is further depressurized to a lower pressure (e.g., 60-300 psia) in a direction the same as (shown in FIG. 13) or opposite (not shown in FIG. 13) as the feed flow.

4. Co-Current (CoC) Depressurization 3 (DP3). The $CO_2$ VPSA bed, which is now at some medium pressure (e.g., 60-300 psia), is further depressurized to a lower pressure (e.g., 50-200 psia) in a direction the same as (shown in FIG. 13) or opposite (not shown in FIG. 13) as the feed flow.

5. Final Depressurization (DPf). The $CO_2$ VPSA bed, which is now at a pressure lower than at the start of step 4 (about 50-200 psia) is further depressurized to a pressure close to ambient (about 20 psia) in a direction the same as (shown in FIG. 13) and/or the opposite (not shown in FIG. 13) the feed flow.

As shown by the arrows in FIG. 13 (i.e. arrows from DPf to bed under evacuation), the stream from this step (DPf) flows through the bed under evacuation (e.g. in FIG. 13: bed 1 to bed 6, bed 2 to bed 1, bed 3 to bed 2, bed 4 to bed 3, bed 5 to bed 4 or bed 6 to bed 5 on the respective cycle steps).

6. Evacuation. The $CO_2$ VPSA bed, which is now close to ambient pressure (about 20 psia), is evacuated to a predetermined low pressure, a subambient pressure (about 1-12 psia) in a direction the same as (not shown in FIG. 13) or opposite (shown in FIG. 13) to the feed flow. As shown in FIG. 13 and outlined in the description of step 5 (DPf) above, this bed is receiving gas from another bed in the DPf step. The gas from the bed under evacuation constitutes the $CO_2$ product stream.

7. Countercurrent (CcC) Pressure Equalization 3 (PE3). The evacuated bed is now pressure equalized to a pressure range of the gas produced in step 4 (DP3) (i.e., to about 50-200 psia) in a direction the same as (not shown in FIG. 13)

or opposite (shown in FIG. 13) to the feed flow. This step increases $CO_2$ recovery by keeping the $CO_2$ from step 4 within the VPSA system. This minimizes $CO_2$ loss by eliminating the need to send the $CO_2$ to a waste stream.

8. Countercurrent (CcC) Pressure Equalization 2 (PE2). The bed pressure equalized in step 7 is now pressure equalized to a pressure range of the gas produced in step 3 (DP2) (i.e., to about 60-300 psia) in a direction the same as (not shown in FIG. 13) or opposite (shown in FIG. 13) to the feed flow. This step increases $CO_2$ recovery by keeping the $CO_2$ from step 3 within the VPSA system. This minimizes $CO_2$ loss by eliminating the need to send the $CO_2$ to a waste stream.

9. Countercurrent Pressure (CcC) Equalization 1 (PE1). The bed pressure equalized in step 8 is further pressure equalized to a pressure range of the gas produced in step 2 (DP1) (i.e., to about 80-400 psia) in a direction the same as (not shown in FIG. 13) or opposite (shown in FIG. 13) to the feed flow. This step further increases $CO_2$ recovery by keeping the $CO_2$ from step 2 within the VPSA system. This minimizes $CO_2$ loss by eliminating the need to send the $CO_2$ to a waste stream.

10. Repressurization (FeRP). The pressure-equalized bed is repressurized to a feed pressure (100-500 psia) either by the feed gas or by part of the effluent generated from another bed in step 1 (i.e. feed effluent). Following repressurization to feed pressure, this bed is now ready to go back to step 1.

The ten-step process described is for one cycle for one bed in the $CO_2$ VPSA unit. The above ten steps for this flow through the evacuating bed embodiment are carried out in a cyclic manner with the other beds in the unit such that feed-into and feed-effluent from step 1 are continuous. In addition, the evacuation step (number 6) is designed to be continuous. This ensures that the vacuum pump operates continuously, and that there is no break in feed-into the $CO_2$ VPSA unit. Six adsorption beds are utilized in the embodiment described above to maintain the continuity of the key process steps.

Exemplary corresponding hardware and a flow schematic of the $CO_2$ VPSA process corresponding to the cycle shown FIG. 13 is depicted in FIG. 14. The various valves in FIG. 14 can be operated in the manner illustrated in FIG. 15 to carry out the ten steps in the six-bed process as described hereinabove. It should be appreciated that pressures and step durations shown are only for illustrative purposes. Those skilled in the art will appreciate that other combinations of pressures and step durations may be used.

As can be appreciated from the above description, the present invention thus relies upon depressurizations of at least one $CO_2$-selective adsorbent from high pressure to low pressure to increase $CO_2$ concentration in the bed. After $CO_2$ concentration is increased, it produces the $CO_2$ product by further pressure reduction. This became possible based on the recognition that for some adsorbents, pressure reduction from high to low pressure increases $CO_2$ concentration on the adsorbent.

In the embodiment shown in FIGS. 13-15 and as described, the gas produced during the final depressurization (step number 5, DPf) flows through the bed under evacuation as shown by the arrows in the cycle step chart in FIG. 13.

Alternative and additional exemplary embodiments that utilize the final depressurization gas stream (DPf) flow through the evacuating bed are illustrated in FIGS. 16 and 17.

Referring now to FIG. 16, a cycle step chart for an eight-step process that utilizes five beds and two pressure equalization steps is shown. These cycle steps are carried out in a similar to those steps described above with reference to FIG. 13, except that steps DP3 and PE3 have been eliminated. More specifically, the cycle steps for FIG. 16 include the following:

1. Feed Step. Feed stream 68 containing carbon dioxide at a high pressure between about 100-500 psia (for example, about 375 psia) is fed to $CO_2$ VPSA unit 70. After a predetermined time or after $CO_2$ breakthrough from the bed on the feed 68, the feed step is terminated.

2. Co-Current (CoC) Depressurization 1 (DP1). The $CO_2$ VPSA bed, which has finished the feed step is now at high feed pressure (e.g., 100-500 psia), is depressurized to a medium pressure (e.g., 80-400 psia) in a direction the same (shown in FIG. 16) or opposite (not shown in FIG. 16) as the feed flow.

3. Co-Current (CoC) Depressurization 2 (DP2). The $CO_2$ VPSA bed, which is now at some medium pressure (e.g., 80-400 psia), is further depressurized to a lower pressure (e.g., 60-300 psia) in a direction the same as (shown in FIG. 16) or opposite (not shown in FIG. 16) as the feed flow.

4. Final Depressurization (DPf). The $CO_2$ VPSA bed, which is now at a pressure lower than at the start of step 4 (about 50-200 psia) is further depressurized to a pressure close to ambient (about 20 psia) in a direction the same as (shown in FIG. 16) and/or the opposite (not shown in FIG. 16) the feed flow.

As shown by the arrows in FIG. 16 (i.e. arrows from DPf to bed under evacuation), the stream from this step (DPf) flows through the bed under evacuation (e.g. as shown in FIG. 16: bed 1 to bed 5, bed 2 to bed 1, bed 3 to bed 2, bed 4 to bed 3 or bed 5 to bed 4 on the respective cycle steps).

5. Evacuation. The $CO_2$ VPSA bed, which is now close to ambient pressure (about 20 psia), is evacuated to a predetermined low pressure, a subambient pressure (about 1-12 psia) in a direction the same as (not shown in FIG. 16) or opposite (shown in FIG. 16) to the feed flow. As shown in FIG. 16 and as outlined in the description of step 4 (DPf) above, this bed is receiving gas from another bed in the DPf step for the duration of the DPf step. The gas from the bed under evacuation constitutes the $CO_2$ product stream.

6. Countercurrent (CcC) Pressure Equalization 2 (PE2). The evacuated bed is now pressure equalized to a pressure range of the gas produced in step 3 (DP2) (i.e., to about 60-300 psia) in a direction the same as (not shown in FIG. 16) or opposite (shown in FIG. 16) to the feed flow. This step increases $CO_2$ recovery by keeping the $CO_2$ from step 3 within the VPSA system. This minimizes $CO_2$ loss by eliminating the need to send the $CO_2$ to a waste stream.

7. Countercurrent Pressure (CcC) Equalization 1 (PE1). The bed pressure equalized in step 6 is further pressure equalized to a pressure range of the gas produced in step 1 (DP1) (i.e., to about 80-400 psia) in a direction the same as (not shown in FIG. 16) or opposite (shown in FIG. 16) to the feed flow. This step further increases $CO_2$ recovery by keeping the $CO_2$ from step 2 within the VPSA system. This minimizes $CO_2$ loss by eliminating the need to send the $CO_2$ to a waste stream.

8. Repressurization (FeRP). The pressure-equalized bed is repressurized to a feed pressure (100-500 psia) either by the feed gas or by part of the effluent generated from another bed in step 1 (i.e. feed effluent). Following repressurization to feed pressure, this bed is now ready to go back to step 1.

The eight-step process described is for one cycle for one bed in the $CO_2$ VPSA unit. The above eight steps for this flow through the evacuating bed embodiment are carried out in a cyclic manner with the other beds in the unit such that feed-into and feed-effluent from step 1 are continuous. In addition, the evacuation step (number 5) is designed to be continuous.

This ensures that the vacuum pump operates continuously, and that there is no break in feed-into the $CO_2$ VPSA unit. Five adsorption beds are utilized in the embodiment described above to maintain the continuity of the key process steps.

Referring now to FIG. 17, a cycle step chart for an eleven-step process that utilizes seven beds and three pressure equalization steps is shown. These cycle steps are carried out in a similar manner to those steps described above with reference to FIG. 13, except that an additional step (Rf) is included between the final depressurization step (DPf) and the evacuation step. More specifically, the cycle steps for FIG. 17 include the following:

1. Feed Step. Feed stream 68 containing carbon dioxide at a high pressure between about 100-500 psia (for example, about 375 psia) is fed to $CO_2$ VPSA unit 70. After a predetermined time or after $CO_2$ breakthrough from the bed on the feed 68, the feed step is terminated.

2. Co-Current (CoC) Depressurization 1 (DP1). The $CO_2$ VPSA bed, which has finished the feed step is now at high feed pressure (e.g., 100-500 psia), is depressurized to a medium pressure (e.g., 80-400 psia) in a direction the same (shown in FIG. 17) or opposite (not shown in FIG. 17) as the feed flow.

3. Co-Current (CoC) Depressurization 2 (DP2). The $CO_2$ VPSA bed, which is now at some medium pressure (e.g., 80-400 psia), is further depressurized to a lower pressure (e.g., 60-300 psia) in a direction the same as (shown in FIG. 17) or opposite (not shown in FIG. 17) as the feed flow.

4. Co-Current (CoC) Depressurization 3 (DP3). The $CO_2$ VPSA bed, which is now at some medium pressure (e.g., 60-300 psia), is further depressurized to a lower pressure (e.g., 50-200 psia) in a direction the same as (shown in FIG. 17) or opposite (not shown in FIG. 17) as the feed flow.

5. Final Depressurization (DPf). The $CO_2$ VPSA bed, which is now at a pressure lower than at the start of step 4 (about 50-200 psia) is further depressurized to a pressure close to ambient (about 20 psia) in a direction the same as (shown in FIG. 17) and/or the opposite (not shown in FIG. 17) the feed flow.

6. Receive Purge (Rf). The stream produced by DPf (e.g., bed 1 in FIG. 17) is fed to another bed having completed DPf, but not yet under evacuation (e.g., bed 7 in FIG. 17). During this time (duration of the Rf step), the effluent (e.g., bed 7 in FIG. 17) flows to tank 442 as $CO_2$ product. During the remaining time period of DPf of bed 1, the gas flows through the bed under evacuation (e.g., bed 7 in FIG. 17).

7. Evacuation. The $CO_2$ VPSA bed, which is now close to ambient pressure (about 20 psia), is evacuated to a predetermined low pressure, a subambient pressure (about 1-12 psia) in a direction the same as (not shown in FIG. 17) or opposite (shown in FIG. 17) to the feed flow. As shown in FIG. 17, this bed (bed 1) is receiving gas from another bed in the DPf step (bed 2). The gas from the bed under evacuation constitutes at least part of the $CO_2$ product stream.

8. Countercurrent (CcC) Pressure Equalization 3 (PE3). The evacuated bed is now pressure equalized to a pressure range of the gas produced in step 4 (DP3) (i.e., to about 50-200 psia) in a direction the same as (not shown in FIG. 17) or opposite (shown in FIG. 17) to the feed flow. This step increases $CO_2$ recovery by keeping the $CO_2$ from step 4 within the VPSA system. This minimizes $CO_2$ loss by eliminating the need to send the $CO_2$ to a waste stream.

9. Countercurrent (CcC) Pressure Equalization 2 (PE2). The bed pressure equalized in step 7 is now pressure equalized to a pressure range of the gas produced in step 3 (DP2) (i.e., to about 60-300 psia) in a direction the same as (not shown in FIG. 17) or opposite (shown in FIG. 17) to the feed flow. This step increases $CO_2$ recovery by keeping the $CO_2$ from step 3 within the VPSA system. This minimizes $CO_2$ loss by eliminating the need to send the $CO_2$ to a waste stream.

10. Countercurrent Pressure (CcC) Equalization 1 (PE1). The bed pressure equalized in step 9 is further pressure equalized to a pressure range of the gas produced in step 2 (DP1) (i.e., to about 80-400 psia) in a direction the same as (not shown in FIG. 17) or opposite (shown in FIG. 17) to the feed flow. This step further increases $CO_2$ recovery by keeping the $CO_2$ from step 2 within the VPSA system. This minimizes $CO_2$ loss by eliminating the need to send the $CO_2$ to a waste stream.

11. Repressurization (FeRP). The pressure-equalized bed is repressurized to a feed pressure (100-500 psia) either by the feed gas or by part of the effluent generated from another bed in step 1 (i.e. feed effluent). Following repressurization to feed pressure, this bed is now ready to go back to step 1.

The eleven-step process described is for one cycle for one bed in the $CO_2$ VPSA unit. The above eleven steps for this flow through the evacuating bed embodiment are carried out in a cyclic manner with the other beds in the unit such that feed-into and feed-effluent from step 1 are continuous. In addition, the evacuation step (number 7) is designed to be continuous. This ensures that the vacuum pump operates continuously, and that there is no break in feed-into the $CO_2$ VPSA unit. Seven adsorption beds are utilized in the embodiment described above to maintain the continuity of the key process steps.

Referring now to FIGS. 18-20, an embodiment of the present invention having six beds (A1-A6) and using ten steps with direct mixing of $CO_2$ gas from the DPf step and the evacuation step to produce a final $CO_2$-enriched gas is illustrated. The process steps include:

1. Feed Step. Feed stream 68 containing carbon dioxide at a high pressure (for example, about 375 psia) is fed to $CO_2$ VPSA unit 70. After a predetermined time or after $CO_2$ breakthrough from the bed on the feed 68, the feed step is terminated.

2. Co-Current (CoC) Depressurization 1 (DP1). The $CO_2$ VPSA bed, which has finished the feed step is now at high feed pressure (e.g., 100-500 psia), is depressurized to a medium pressure (e.g., 80-400 psia) in a direction the same (shown in FIG. 18) or opposite (not shown in FIG. 18) as the feed flow.

3. Co-Current (CoC) Depressurization 2 (DP2). The $CO_2$ VPSA bed, which is now at some medium pressure (e.g., 80-400 psia), is further depressurized to a lower pressure (e.g., 60-300 psia) in a direction the same as (shown in FIG. 18) or opposite (not shown in FIG. 18) as the feed flow.

4. Co-Current (CoC) Depressurization 3 (DP3). The $CO_2$ VPSA bed, which is now at some medium pressure (e.g., 60-300 psia), is further depressurized to a lower pressure (e.g., 50-200 psia) in a direction the same as (shown in FIG. 18) or opposite (not shown in FIG. 18) as the feed flow.

5. Final Depressurization (DPf). The $CO_2$ VPSA bed, which is now at a pressure lower than at the start of step 4 (about 50-200 psia) is further depressurized to a pressure close to ambient (about 20 psia) in a direction the same as (not shown in FIG. 18) and/or the opposite (shown in FIG. 18) the feed flow to produce $CO_2$ product 438 shown in FIG. 19. This stream may constitute part of the $CO_2$ product (stream 19).

6. Evacuation. The $CO_2$ VPSA bed, which is now close to ambient pressure (about 20 psia), is evacuated to a predetermined low pressure, a subambient pressure (about 1-12 psia) in a direction the same as (not shown in FIG. 18) or opposite (shown in FIG. 18) to the feed flow. The gas from the bed under evacuation (stream 436 in FIG. 19) constitutes part of the CO$_2$ product stream (stream 19). Optionally, stream 436 can be further compressed using a blower (not shown) prior to passing to tank 442.

7. Countercurrent (CcC) Pressure Equalization 3 (PE3). The evacuated bed is now pressure equalized to a pressure range of the gas produced in step 4 (DP3) (i.e., to about 50-200 psia) in a direction the same as (not shown in FIG. 18) or opposite (shown in FIG. 18) to the feed flow. This step increases CO$_2$ recovery by keeping the CO$_2$ from step 4 within the VPSA system. This minimizes CO$_2$ loss by eliminating the need to send the CO$_2$ to a waste stream.

8. Countercurrent (CcC) Pressure Equalization 2 (PE2). The bed pressure equalized in step 7 is now pressure equalized to a pressure range of the gas produced in step 3 (DP2) (i.e., to about 60-300 psia) in a direction the same as (not shown in FIG. 18) or opposite (shown in FIG. 18) to the feed flow. This step increases CO$_2$ recovery by keeping the CO$_2$ from step 3 within the VPSA system. This minimizes CO$_2$ loss by eliminating the need to send the CO$_2$ to a waste stream.

9. Countercurrent Pressure (CcC) Equalization 1 (PE1). The bed pressure equalized in step 8 is further pressure equalized to a pressure range of the gas produced in step 2 (DP1) (i.e., to about 80-400 psia) in a direction the same as (not shown in FIG. 18) or opposite (shown in FIG. 18) to the feed flow. This step further increases CO$_2$ recovery by keeping the CO$_2$ from step 2 within the VPSA system. This minimizes CO$_2$ loss by eliminating the need to send the CO$_2$ to a waste stream.

10. Repressurization (FeRP). The pressure-equalized bed is repressurized to a feed pressure (100-500 psia) either by the feed gas or by part of the effluent generated from another bed in step 1 (i.e. feed effluent). Following repressurization to feed pressure, this bed is now ready to go back to step 1.

As further shown in FIG. 18, CO$_2$ product 19 is formed of CO$_2$ from streams 438 (step 6) and 436 (step 7) fed to product tank 442. Product 19 is expected to have a CO$_2$ purity level of approximately 80 mole percent or greater.

The ten-step process described is for one cycle for one bed in the CO$_2$ VPSA unit. The above ten steps for this direct mixing embodiment are carried out in a cyclic manner with the other beds in the unit such that feed-into and feed-effluent from step 1 are continuous. In addition, the evacuation step (number 6) is designed to be continuous. This ensures that the vacuum pump operates continuously, and that there is no break in feed-into the CO$_2$ VPSA unit. Six adsorption beds are utilized in the embodiment described above to maintain the continuity of the key process steps.

Exemplary corresponding hardware and a flow schematic of the CO$_2$ VPSA process corresponding to the cycle shown FIG. 18 is depicted in FIG. 19. The various valves in FIG. 19 can be operated in the manner illustrated in FIG. 20 to carry out the ten steps in the six-bed process as described hereinabove. It should be appreciated that pressures and step durations shown are only for illustrative purposes. Those skilled in the art will appreciate that other combinations of pressures and steps may be used.

In the embodiment shown in FIGS. 18-20 and as described herein, the gas produced during the final depressurization step (DPf) is mixed with the evacuated gas from step number 6.

Another exemplary embodiment that utilizes direct mixing of the final depressurization gas stream (DPf) with the gas produced by evacuation bed is illustrated in FIG. 21.

Referring now to FIG. 21, a cycle step chart for an eight-step process that utilizes five beds and two pressure equalization steps is shown. These cycle steps are carried out in a similar manner to those steps described above with reference to FIG. 18, except that steps DP3 and PE3 have been eliminated. More specifically, the cycle steps for FIG. 21 include the following:

1. Feed Step. Feed stream 68 containing carbon dioxide at a high pressure between about 100-500 psia (for example, about 375 psia) is fed to CO$_2$ VPSA unit 70. After a predetermined time or after CO$_2$ breakthrough from the bed on the feed 68, the feed step is terminated.

2. Co-Current (CoC) Depressurization 1 (DP1). The CO$_2$ VPSA bed, which has finished the feed step is now at high feed pressure (e.g., 100-500 psia), is depressurized to a medium pressure (e.g., 80-400 psia) in a direction the same (shown in FIG. 21) or opposite (not shown in FIG. 21) as the feed flow.

3. Co-Current (CoC) Depressurization 2 (DP2). The CO$_2$ VPSA bed, which is now at some medium pressure (e.g., 80-400 psia), is further depressurized to a lower pressure (e.g., 60-300 psia) in a direction the same as (shown in FIG. 21) or opposite (not shown in FIG. 21) as the feed flow.

4. Final Depressurization (DPf). The CO$_2$ VPSA bed, which is now at a pressure lower than at the start of step 4 (about 50-200 psia) is further depressurized to a pressure close to ambient (about 20 psia) in a direction the same as (not shown in FIG. 21) and/or the opposite (shown in FIG. 21) the feed flow to produce CO$_2$ product 438. This stream may constitute part of the CO$_2$ product (stream 19).

5. Evacuation. The CO$_2$ VPSA bed, which is now close to ambient pressure (about 20 psia), is evacuated to a predetermined low pressure, a subambient pressure (about 1-12 psia) in a direction the same as (not shown in FIG. 21) or opposite (shown in FIG. 21) to the feed flow. The gas from the bed under evacuation (stream 36a in FIG. 19) constitutes part of the CO$_2$ product stream (stream 19). Optionally, stream 436 can be further compressed using a blower (not shown) prior to passing to tank 442.

6. Countercurrent (CcC) Pressure Equalization 2 (PE2). The evacuated bed is now pressure equalized to a pressure range of the gas produced in step 3 (DP2) (i.e., to about 60-300 psia) in a direction the same as (not shown in FIG. 21) or opposite (shown in FIG. 21) to the feed flow. This step increases CO$_2$ recovery by keeping the CO$_2$ from step 3 within the VPSA system. This minimizes CO$_2$ loss by eliminating the need to send the CO$_2$ to a waste stream.

7. Countercurrent Pressure (CcC) Equalization 1 (PE1). The bed pressure equalized in step 6 is further pressure equalized to a pressure range of the gas produced in step 2 (DP1) (i.e., to about 80-400 psia) in a direction the same as (not shown in FIG. 21) or opposite (shown in FIG. 21) to the feed flow. This step further increases CO$_2$ recovery by keeping the CO$_2$ from step 2 within the VPSA system. This minimizes CO$_2$ loss by eliminating the need to send the CO$_2$ to a waste stream.

8. Repressurization (FeRP). The pressure-equalized bed is repressurized to a feed pressure (100-500 psia) either by the feed gas or by part of the effluent generated from another bed in step 1 (i.e. feed effluent). Following repressurization to feed pressure, this bed is now ready to go back to step 1.

The CO$_2$ product stream 19 is formed of CO$_2$ from streams 438 (step 4) and 436 (step 5) in product tank 442.

The eight-step process described is for one cycle for one bed in the CO$_2$ VPSA unit. The above eight steps for this direct mixing embodiment are carried out in a cyclic manner with the other beds in the unit such that feed-into and feed-effluent from step 1 are continuous. In addition, the evacuation step (number 5) is designed to be continuous. This ensures that the vacuum pump operates continuously, and that there is no break in feed-into the CO$_2$ VPSA unit. Five adsorption beds are utilized in the embodiment described above to maintain the continuity of the key process steps.

It is also expected that the present invention can be modified to produce higher amounts of $CO_2$ and thus high plant capacity. For example, one may need or desire to process higher feed flow rates than may be handled by a single vacuum train or single vessel (due to fluidization or transportation limitations). In such situations, the process steps may be arranged such that at least two beds are on feed and at least two beds are under evacuation all the time. Such exemplary cycle step charts and arrangement are shown in FIGS. 22 and 23. Alternatively or in addition, multiple trains can be used.

Absorption

When stage 70 uses physical absorption with solvents such as selexol and rectisol, it can be placed just downstream of subambient-temperature processing stage 60. The $CO_2$-depleted stream from such a physical absorption unit will be generally free of moisture. Physical absorption units process vent stream 68 from stage 60 as shown in FIGS. 1-4 and produce $CO_2$-rich stream 19 and $CO_2$-lean stream 72.

Figure 24:
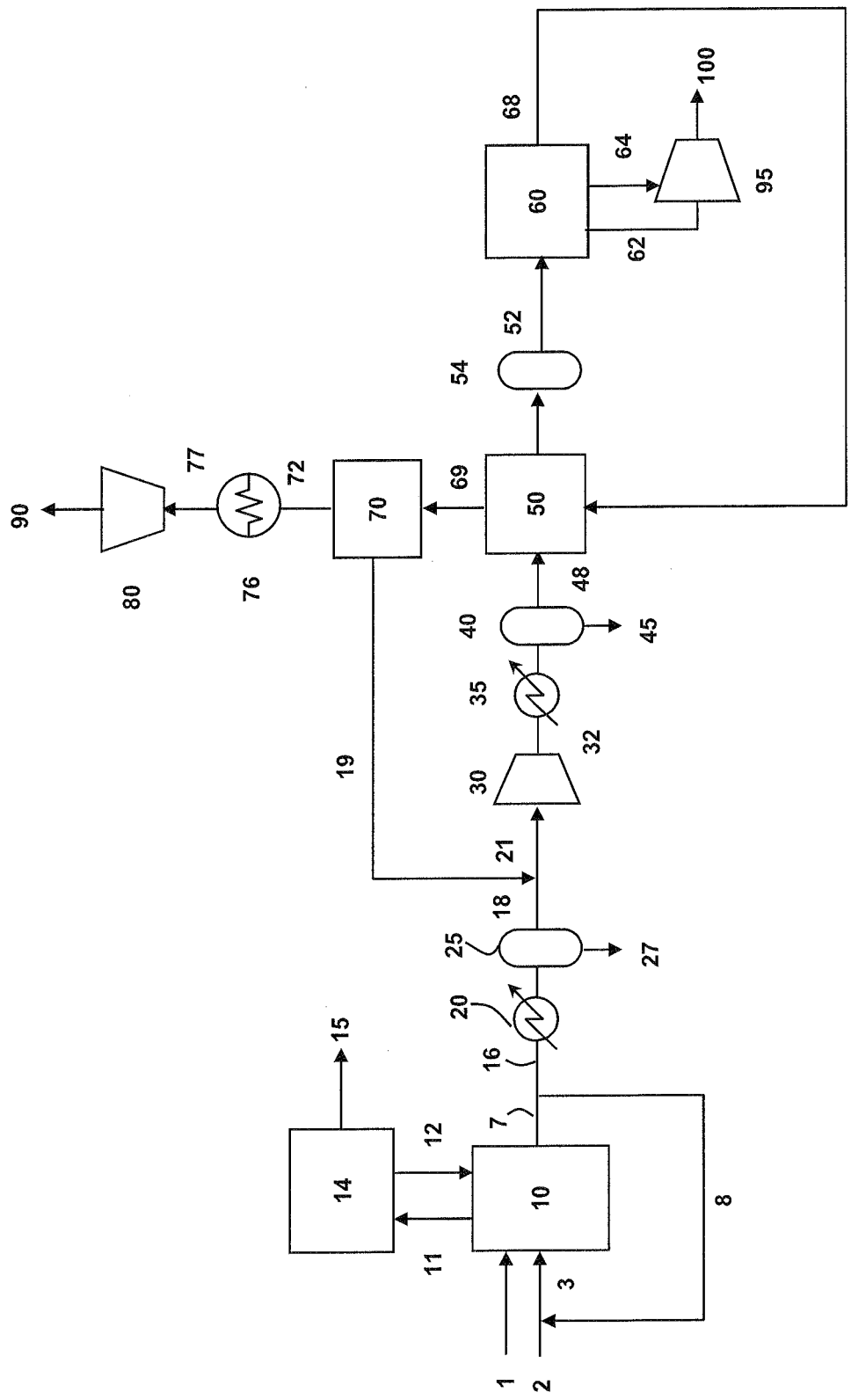
FIG. 24 is a diagram showing the incorporation of another embodiment of the method of the present invention, employing absorption, into an oxy-fuel combustion system.

When stage 70 uses chemical absorption with reactant streams such as an aqueous solution of alkyl-substituted amine, ammonia or potassium carbonate, the units are preferably arranged as shown in FIG. 24, in which chemical absorption unit 70 is preferably placed after the vent stream 68 has been used as a regeneration gas for the dryer unit 50. The $CO_2$-lean stream 72 from such an absorption system is likely to contain water, and is therefore not suitable for use as a regeneration gas. The moisture laden $CO_2$-lean stream 69 is passed to the chemical absorption system 70 where it is treated by any known method in which the gaseous stream 69 is contacted with an aqueous solution of alkylamine, ammonia or potassium carbonate to absorb carbon dioxide from the gaseous stream into the aqueous stream, and the carbon dioxide is subsequently stripped from the resulting carbon dioxide-enriched aqueous stream.

Figure 25:
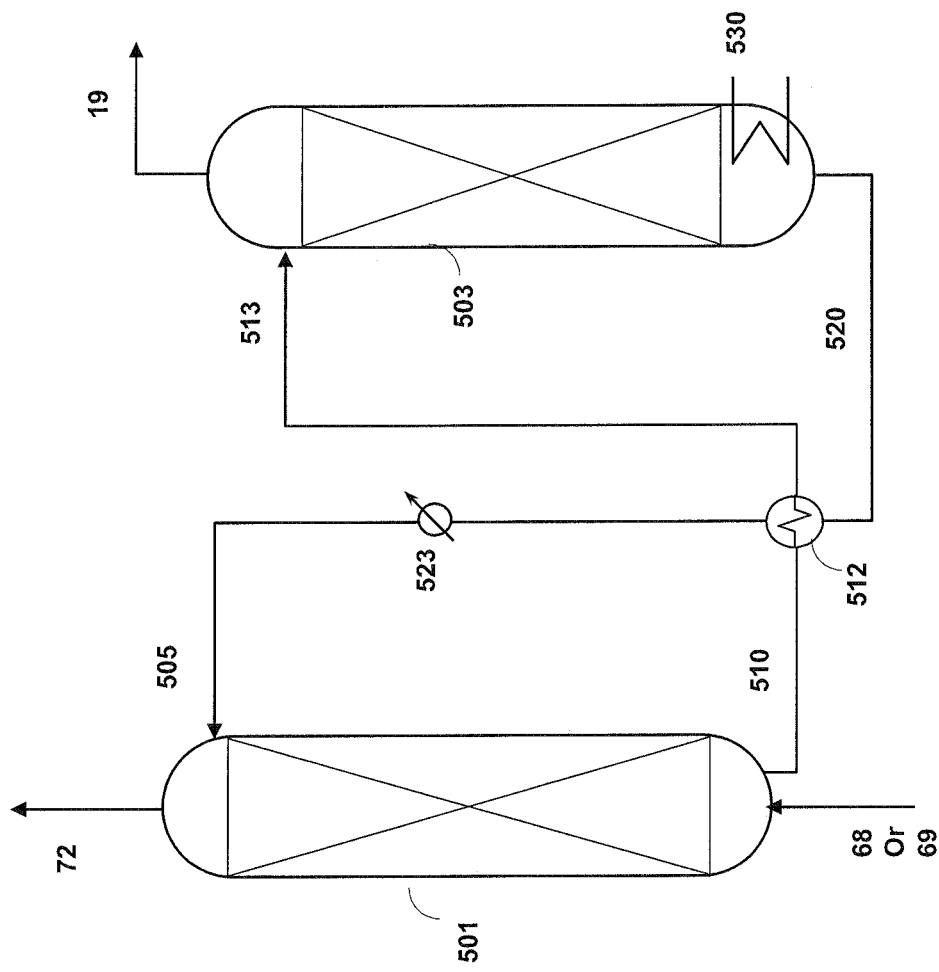
FIG. 25 is a diagram of a process useful in employing absorption in the method of the present invention.

FIG. 25 shows a flowsheet applicable to physical absorption and chemical absorption based $CO_2$ separation systems. The $CO_2$-lean stream 68 as shown in FIGS. 1 to 4 or $CO_2$-lean stream 69 shown in FIG. 24 is introduced into absorber 501 from the bottom. Stream 505 of solvent (as that term is used respectively with respect to physical absorption and chemical absorption processes) is fed to absorber 501 from the top. The solvent absorbs $CO_2$ from the feed stream. The resulting $CO_2$-laden stream 510 is heated in heat exchanger 512 by recovering heat from $CO_2$-lean solvent 520. The heated $CO_2$-laden stream 513 is fed to the stripper 503. Optionally, the stripper is heated from the bottom by supplying heat via reboiler 530. A $CO_2$-rich stream 19 is recovered from the top of stripper 503. The $CO_2$-lean solvent 520 is cooled in heat exchanger 512 and then in cooler 523 and recycled to absorber 501 as stream 505.

Removal of NOx and CO

Stream 72 can be treated, if desired, to reduce the content of carbon monoxide, NOx, or both.

To reduce carbon monoxide, the stream is first preferably heated, and is then passed through a reactor containing a catalyst that promotes the conversion of carbon monoxide to carbon dioxide by reaction with oxygen present in the atmosphere within the reactor. Suitable catalysts for this conversion reaction are well known in this field. Examples of useful catalysts include iron oxide or noble metal (such as copper, ruthenium, platinum, palladium, rhodium, gold) on an alumina carrier. This reaction can reduce levels of CO by more than 98%.

To reduce the NOx content of the stream, the stream and a stream containing ammonia are fed to a reactor which contains a catalyst that promotes the conversion of NOx to nitrogen as represented by the reaction

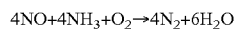

Suitable catalysts for promoting this reaction are well known in this field. Examples include vanadium pentoxide with tungsten or molybdenum oxide as promoter on tungsten oxide as a carrier. This reaction can reduce the level of NOx by more than 95%.

Figure 3:
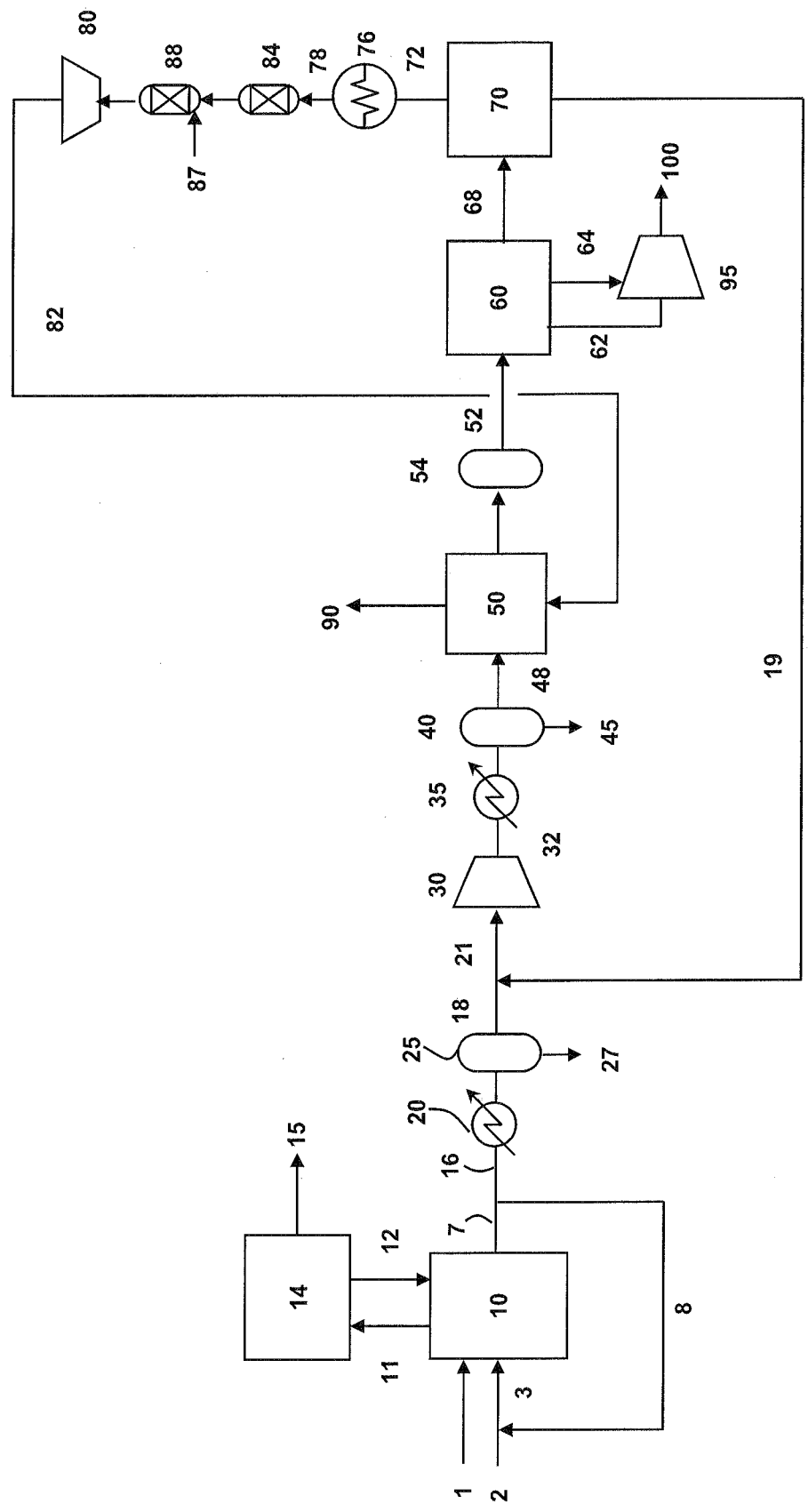
FIG. 3 is a diagram showing the incorporation of another embodiment of the method of the present invention into an oxy-fuel combustion system.

FIG. 3 shows one embodiment where NOx and carbon monoxide (CO) emissions are reduced in addition to $CO_2$ emissions. In this scheme, the $CO_2$-depleted stream 72 is heated to 500 to 800° F. in heater 76. The heated stream 78 is passed through a catalytic reactor 84 where carbon monoxide is oxidized into carbon dioxide. The effluent from reactor 84 is sent to another catalytic reactor 86 where nitric oxide (NO) contained in stream 78 is converted to nitrogen by reacting it with ammonia fed as stream 87.

What is claimed is:

1. A method for recovering carbon dioxide comprising
   (A) providing a carbon dioxide-augmented feed gas by adding carbon dioxide to a flue gas produced by oxy-fuel combustion wherein the flue gas comprises at least carbon dioxide, water vapor, NOx and carbon monoxide, wherein the feed gas contains less than 0.1 vol. % hydrogen;
   (B) compressing the feed gas and then drying the compressed feed gas by contacting it with an adsorbent to form moisture-laden adsorbent and a dried gaseous feed stream;
   (C) subjecting the dried gaseous feed stream to a subambient-temperature recovery process, employing refrigeration provided by expansion of at least one liquid carbon dioxide product stream formed by said recovery process, to produce at least one gaseous carbon dioxide product stream and at least one gaseous carbon dioxide-containing vent stream;
   (D) separating the vent stream into a carbon dioxide-rich stream and a carbon dioxide-depleted stream, by pressure swing adsorption or by physical or chemical absorption;
   (E) desorbing moisture from said moisture-laden adsorbent by contacting said moisture-laden adsorbent with said carbon dioxide-depleted stream to form a moisture-laden carbon dioxide-depleted stream and then separating said moisture-laden carbon dioxide-depleted stream from said adsorbent; and
   (F) combining said carbon dioxide-rich stream with said flue gas to form said carbon dioxide-augmented feed gas.

2. The method of claim 1 wherein refrigeration employed in step (C) is provided only by said expansion.

3. The method of claim 1 wherein at least a portion of said carbon dioxide-rich stream is contacted with said moisture-laden adsorbent to desorb moisture from said moisture-laden adsorbent and is then combined with said flue gas.

4. The method of claim 1 wherein said carbon dioxide-depleted stream is treated before or after expansion thereof to reduce its content of NOx.

5. The method of claim 1 wherein said carbon dioxide-depleted stream is treated before or after expansion thereof to reduce its content of carbon monoxide.

6. The method of claim 1 wherein said carbon dioxide-depleted stream is expanded before it is contacted with said moisture-laden adsorbent.

7. A method for recovering carbon dioxide comprising
(A) providing a carbon dioxide-augmented feed gas by adding carbon dioxide to a flue gas produced by oxy-fuel combustion wherein the flue gas comprises at least carbon dioxide, water vapor, NOx and carbon monoxide, wherein the feed gas contains less than 0.1 vol. % hydrogen;
(B) compressing the feed gas and then drying the compressed feed gas by contacting it with an adsorbent to form moisture-laden adsorbent and a dried gaseous feed stream;
(C) subjecting the dried gaseous feed stream to a subambient-temperature recovery process, employing refrigeration provided by expansion of at least one liquid carbon dioxide product stream formed by said recovery process, to produce at least one gaseous carbon dioxide product stream and at least one gaseous carbon dioxide-containing vent stream;
(D) separating the vent stream into a carbon dioxide-rich stream and a carbon dioxide-depleted stream, by pressure swing adsorption or by physical or chemical absorption;
(E) expanding said carbon dioxide-depleted stream to form an expanded carbon dioxide-depleted stream;
(F) desorbing moisture from said moisture-laden adsorbent by contacting said moisture-laden adsorbent with a stream of nitrogen and then purging nitrogen from said adsorbent by contacting said adsorbent with said expanded carbon dioxide-depleted stream, and then separating said carbon dioxide-depleted stream from said adsorbent; and
(G) combining said carbon dioxide-rich stream with said flue gas to form said carbon dioxide-augmented feed gas.

8. A method for recovering carbon dioxide comprising
(A) providing a carbon dioxide-augmented feed gas by adding carbon dioxide to a flue gas produced by oxy-fuel combustion wherein the flue gas comprises at least carbon dioxide, water vapor, NOx and carbon monoxide, wherein the feed gas contains less than 0.1 vol. % hydrogen;
(B) compressing the feed gas and then drying the compressed feed gas by contacting it with an adsorbent to form moisture-laden adsorbent and a dried gaseous feed stream;
(C) subjecting the dried gaseous feed stream to a subambient-temperature recovery process, employing refrigeration provided by expansion of at least one liquid carbon dioxide product stream formed by said recovery process, to produce at least one gaseous carbon dioxide product stream and at least one gaseous carbon dioxide-containing vent stream;
(D) desorbing moisture from said moisture-laden adsorbent by contacting said moisture-laden adsorbent with said vent stream to form a moisture-laden vent stream and then separating said moisture-laden vent stream from said adsorbent;
(E) separating the vent stream into a carbon dioxide-rich stream and a carbon dioxide-depleted stream, by pressure swing adsorption or by physical or chemical absorption; and
(F) combining said carbon dioxide-rich stream with said flue gas to form said carbon dioxide-augmented feed gas.

9. Apparatus for recovering carbon dioxide comprising
(A) compressor apparatus capable of compressing carbon dioxide-containing gas to produce a compressed carbon dioxide-containing stream;
(B) dryer apparatus coupled to said apparatus for compressing to receive said compressed carbon dioxide-containing stream, and capable of reducing the water content of said compressed carbon dioxide-containing stream to produce a dried carbon dioxide-containing stream, wherein the dryer apparatus comprises one or more beds containing adsorbent for water which can alternately adsorb water and be desorbed of water by contact with a carbon dioxide-depleted stream produced in separation apparatus (D);
(C) processing apparatus coupled to said dryer apparatus to receive said dried carbon dioxide-containing stream, and capable of producing therefrom at least one gaseous carbon dioxide product stream and at least one gaseous carbon dioxide-containing vent stream, by subambient-temperature processing;
(D) separation apparatus coupled to said processing apparatus to receive said vent stream, and capable of producing from said vent stream a carbon dioxide-rich stream and a carbon dioxide-depleted stream by pressure swing adsorption or by physical or chemical absorption, and coupled to said compressor apparatus to pass said carbon dioxide-rich stream to said compressor apparatus, and coupled to said dryer apparatus so that said carbon dioxide-depleted stream can pass to said dryer apparatus.

10. Apparatus of claim 9 further comprising expander apparatus coupled to said separation apparatus to receive and expand said carbon dioxide-depleted stream and coupled to said dryer apparatus so that said expanded carbon dioxide-depleted stream can pass to said dryer apparatus.

11. Apparatus for recovering carbon dioxide comprising
(A) compressor apparatus capable of compressing carbon dioxide-containing gas to produce a compressed carbon dioxide-containing stream;
(B) dryer apparatus coupled to said apparatus for compressing to receive said compressed carbon dioxide-containing stream, and capable of reducing the water content of said compressed carbon dioxide-containing stream to produce a dried carbon dioxide-containing stream, wherein the dryer apparatus comprises one or more beds containing adsorbent for water which can alternately adsorb water and be desorbed of water by contact with a vent stream from processing apparatus (C);
(C) processing apparatus coupled to said dryer apparatus to receive said dried carbon dioxide-containing stream, and capable of producing therefrom at least one gaseous carbon dioxide product stream and at least one gaseous carbon dioxide-containing vent stream, by subambient-temperature processing;
(D) separation apparatus coupled to said dryer apparatus to receive said vent stream, and capable of producing from said vent stream a carbon dioxide-rich stream and a carbon dioxide-depleted stream by pressure swing adsorption or by physical or chemical absorption, and coupled to said compressor apparatus so that said carbon dioxide-rich stream can pass to said compressor apparatus.

* * * * *